(12) United States Patent
Yerramalli et al.

(10) Patent No.: US 11,218,206 B2
(45) Date of Patent: Jan. 4, 2022

(54) CHANNEL STATE INFORMATION (CSI) COMPUTATION FOR EFFECTIVE ISOTROPIC RADIATED POWER (EIRP)-CONSTRAINED TRANSMISSIONS

(71) Applicant: QUALCOMM Incorporated, San Diego, CA (US)

(72) Inventors: Srinivas Yerramalli, San Diego, CA (US); Xiaoxia Zhang, San Diego, CA (US); Jing Sun, San Diego, CA (US); Seyed Ali Akbar Fakoorian, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 16/513,010

(22) Filed: Jul. 16, 2019

(65) Prior Publication Data

US 2020/0028558 A1    Jan. 23, 2020

Related U.S. Application Data

(60) Provisional application No. 62/700,008, filed on Jul. 18, 2018.

(51) Int. Cl.
*H04B 17/309* (2015.01)
*H04B 7/06* (2006.01)
(Continued)

(52) U.S. Cl.
CPC ......... *H04B 7/0626* (2013.01); *H04B 7/0456* (2013.01); *H04B 17/309* (2015.01); *H04W 52/18* (2013.01); *H04W 74/0833* (2013.01)

(58) Field of Classification Search
CPC .. H04B 7/0626; H04B 17/309; H04B 7/0456; H04B 17/318; H04B 17/102;
(Continued)

(56) References Cited

U.S. PATENT DOCUMENTS

2002/0159395 A1\* 10/2002 Nelson, Jr. ........ H04W 72/0446
370/252
2006/0199604 A1\* 9/2006 Walton .................. H04W 52/42
455/522
(Continued)

OTHER PUBLICATIONS

Vithanage et al., "On Capacity—Optimal Precoding for Multiple Antenna Systems Subject to EIRP Restrictions," IEEE Transactions on Wireless Communications, vol. 7, No. 12, Dec. 2008, pp. 5182-5187 (Year: 2008).\*

(Continued)

*Primary Examiner* — Un C Cho
*Assistant Examiner* — Lalita W Pace
(74) *Attorney, Agent, or Firm* — Liem T. Do

(57) ABSTRACT

Methods, systems, and devices for wireless communications are described. In some cases, a wireless device such as a user equipment (UE) may receive a downlink transmission from a base station over a wireless channel, select, based on the received downlink transmission, a channel state information (CSI) computation mode for the wireless channel, where the CSI computation mode is based on an effective isotropic radiated power (EIRP) constraint, measure a set of one or more CSI reference signals (CSI-RSs) from the base station to obtain a CSI measurement, and transmit a CSI report to the base station based on the selected CSI computation mode and the CSI measurement.

25 Claims, 15 Drawing Sheets

(51) Int. Cl.
*H04W 52/18* (2009.01)
*H04B 7/0456* (2017.01)
*H04W 74/08* (2009.01)

(58) Field of Classification Search
CPC ... H04B 7/0417; H04B 7/0645; H04W 52/18; H04W 74/0833; H04W 52/42; H04W 52/367; H04W 24/00; H04W 24/08; H04L 5/0057; H04L 5/0094; H04L 1/0026; H04L 1/0003; H04L 1/0009; H04L 1/20
See application file for complete search history.

(56) References Cited

U.S. PATENT DOCUMENTS

| | | | | |
|---|---|---|---|---|
| 2013/0195161 A1* | 8/2013 | Hammarwall | | H04B 7/063 375/224 |
| 2013/0279460 A1* | 10/2013 | Kim | | H04W 24/02 370/329 |
| 2013/0294487 A1* | 11/2013 | Kim | | H04L 1/0009 375/219 |
| 2014/0177607 A1* | 6/2014 | Li | | H04W 52/42 370/336 |
| 2015/0043463 A1* | 2/2015 | Yamazaki | | H04B 7/0452 370/329 |
| 2018/0083680 A1* | 3/2018 | Guo | | H04L 5/0048 |
| 2018/0310193 A1* | 10/2018 | Bhorkar | | H04L 5/0057 |
| 2018/0324007 A1* | 11/2018 | Nammi | | H04B 7/0626 |
| 2019/0053171 A1* | 2/2019 | Jung | | H04W 52/24 |
| 2019/0281487 A1* | 9/2019 | Liu | | H04W 24/10 |
| 2020/0021349 A1* | 1/2020 | Chapman | | H04B 7/043 |
| 2020/0077437 A1* | 3/2020 | Stern-Berkowitz | | H04B 7/0413 |
| 2020/0100327 A1* | 3/2020 | Zhang | | H04W 88/10 |

OTHER PUBLICATIONS

Doose et al, "Joint Precoding and Power Control for EIRP-Limited MIMO Systems," IEEE Transactions on Wireless Communications, vol. 17, No. 3, Mar. 2018, pp. 1727-1737 (Year: 2018).*

Ericsson: "Pcmaxfor mmW", TSG-RAN Working Group 4 (Radio) Meeting NR#3, 3GPP Draft; R4-1709354, 3rd Generation Partnership Project (3GPP), Mobile Competence Centre; 650, Route Des Lucioles; F-06921 Sophia-Antipolis Cedex; France, vol. TSG RAN, No. Nagoya, Japan; Sep. 18, 2017-Sep. 21, 2017, Sep. 17, 2017 (Sep. 17, 2017), 4 Pages, XP051344494, Retrieved from the Internet: URL: http://www.3gpp.org/ftp/Meetings_3GPP_SYNC/RAN4/Docs/ [retrieved on Sep. 17, 2017] sections 1, 2, 3, 7.

International Search Report and Written Opinion—PCT/US2019/042212—ISA/EPO—dated Oct. 31, 2019.

Qualcomm Incorporated: "Beam Management for NR", 3GPP TSG RAN1 NR AdHoc, 3GPP Draft; R1-1700800_Beam_Management_for_NR, 3rd Generation Partnership Project (3GPP), Mobile Competence Centre, 650, Route Des Lucioles, F-06921 Sophia-Antipolis Cedex, France, vol. RAN WG1, No. Spokane, U.S.A.; Jan. 16, 2017-Jan. 20, 2017, Jan. 16, 2017 (Jan. 16, 2017), 7 Pages, XP051208320, Retrieved from the Internet: URL: http://www.3gpp.org/ftp/Meetings_3GPP_SYNC/RAN1/Docs/ [retrieved on Jan. 16, 2017] section 2.4.

* cited by examiner

CHANNEL STATE INFORMATION (CSI) COMPUTATION FOR EFFECTIVE ISOTROPIC RADIATED POWER (EIRP)-CONSTRAINED TRANSMISSIONS

CROSS REFERENCE

The present application for patent claims the benefit of U.S. Provisional Patent Application No. 62/700,008 by Yerramalli et al., entitled "CHANNEL STATE INFORMATION (CSI) COMPUTATION FOR EFFECTIVE ISOTROPIC RADIATED POWER (EIRP)-CONSTRAINED TRANSMISSIONS," filed Jul. 18, 2018, assigned to the assignee hereof, and expressly incorporated by reference in its entirety herein.

BACKGROUND

The following relates generally to wireless communications, and more specifically to channel state information (CSI) computation for effective isotropic radiated power (EIRP)-constrained transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, such as those operating in a contention-based or other shared radio frequency spectrum band, wireless devices (e.g., UEs, base stations) may be limited by one or more transmission constraints. For instance, regulatory agencies (e.g., Federal Communications Commission (FCC)) may set a total power limit (e.g., EIRP limit), which may be based on whether the spectrum in use is unlicensed or licensed, whether the frequency band is in use, etc. Further, in some cases, in addition to the total power limit in unlicensed spectrum, wireless devices may be limited by an overall power spectral density (PSD) limit. In some cases, a UE may not be aware a base station is operating under EIRP constraints, which may impact channel quality reporting. Thus, efficient techniques for reporting channel quality, for example, based on EIRP constraints at the base station, may serve to optimize network performance.

SUMMARY

The described techniques relate to improved methods, systems, devices, or apparatuses that support channel state information (CSI) computation for effective isotropic radiated power (EIRP) constrained transmissions. Generally, the described techniques provide for different CSI measurement and reporting techniques based on an operating mode (i.e., standard mode, or EIRP-constrained mode) at the base station. In some examples, regulatory guidance may impose a total power limit, and/or a power spectral density (PSD) limit, which may be based in part on frequency band in use, unlicensed or licensed spectrum, etc. In some aspects, EIRP limits may be specified per unit bandwidth (e.g., 1 megahertz (MHz) bandwidth). In one example, assuming a user equipment (UE) allocation exceeds 1 MHz bandwidth (e.g., more than 1 resource block (RB) at 60 kilohertz (kHz) subcarrier spacing), EIRP limitations may be applied on a per RB basis. In some circumstances, for a particular UE computing and reporting CSI, EIRP constraints may be accounted for to improve reporting accuracy, as well as optimize uplink power. For instance, a UE may employ different modes of CSI reporting based on explicit signaling (e.g., Radio Resource Control (RRC)), or path loss measured at the UE.

In some cases, the base station may signal a scaling factor to account for a transmit power backoff in EIRP-constrained mode, reduce the scheduled modulation and coding scheme (MCS) (e.g., modulation depth), and increase the scheduled rank, modify the mapping scheme used for downlink (e.g., Physical Downlink Shared Channel (PDSCH), or NR-PDSCH) transmissions, provide an offset applicable for EIRP-constrained scenarios, or a combination thereof. In some other cases, the base station may switch to a different transmission scheme (e.g., space time block coding (STBC), or space frequency block coding (SFBC)). In some cases, the network or base station may introduce antenna port selection, for example, while utilizing a codebook based precoding scheme. For instance, the base station may select a subset of possible codebooks to specify for port selection when the number of antennas exceeds a threshold. That is, under EIRP constraints, the base station may only use a subset of antenna ports to compensate for the smaller scaling factor. In some cases, while operating in EIRP-constrained mode, the payload size may be calculated to be independent of the number of layers used. In such cases, the UE may utilize a combination of the number of layers used for transport block size (TBS) determination, and the number of actual transmission layers to compute/report CSI.

A method of wireless communications at a UE is described. The method may include receiving a downlink transmission from a base station over a wireless channel, selecting, based on the received downlink transmission, a CSI computation mode for the wireless channel, where the CSI computation mode is based on an EIRP constraint, measuring a set of one or more CSI reference signals (CSI-RSs) from the base station to obtain a CSI measurement, and transmitting a CSI report to the base station based on the selected CSI computation mode and the CSI measurement.

An apparatus for wireless communications at a UE is described. The apparatus may include a processor, memory in electronic communication with the processor, and instructions stored in the memory. The instructions may be executable by the processor to cause the apparatus to receive a downlink transmission from a base station over a wireless channel, select, based on the received downlink transmission, a CSI computation mode for the wireless channel, where the CSI computation mode is based on an effective isotropic radiated power (EIRP) constraint, measure a set of one or more CSI-RSs from the base station to obtain a CSI measurement, and transmit a CSI report to the base station based on the selected CSI computation mode and the CSI measurement.

Another apparatus for wireless communications at a UE is described. The apparatus may include means for receiving a downlink transmission from a base station over a wireless channel, selecting, based on the received downlink transmission, a CSI computation mode for the wireless channel, where the CSI computation mode is based on an EIRP constraint, measuring a set of one or more CSI-RSs from the base station to obtain a CSI measurement, and transmitting a CSI report to the base station based on the selected CSI computation mode and the CSI measurement.

A non-transitory computer-readable medium storing code for wireless communications at a UE is described. The code may include instructions executable by a processor to receive a downlink transmission from a base station over a wireless channel, select, based on the received downlink transmission, a CSI computation mode for the wireless channel, where the CSI computation mode is based on an EIRP constraint, measure a set of one or more CSI-RSs from the base station to obtain a CSI measurement, and transmit a CSI report to the base station based on the selected CSI computation mode and the CSI measurement.

In some examples of the method, apparatuses, and non-transitory computer-readable medium described herein, receiving the downlink transmission from the base station may include operations, features, means, or instructions for receiving in the downlink transmission an indication of the CSI computation mode, where selecting the CSI computation mode may be further based on the indication of the CSI computation mode.

In some examples of the method, apparatuses, and non-transitory computer-readable medium described herein, receiving the downlink transmission from the base station may include operations, features, means, or instructions for receiving in the downlink transmission an indication of the CSI computation mode, where selecting the CSI computation mode may be further based on the indication of the CSI computation mode.

Some examples of the method, apparatuses, and non-transitory computer-readable medium described herein may further include operations, features, means, or instructions for determining a pathloss of the downlink transmission, where selecting the CSI computation mode may be further based on the pathloss of the downlink transmission.

Some examples of the method, apparatuses, and non-transitory computer-readable medium described herein may further include operations, features, means, or instructions for scaling the CSI measurement based on the selected CSI computation mode, where the CSI report may be based on the scaled CSI measurement.

Some examples of the method, apparatuses, and non-transitory computer-readable medium described herein may further include operations, features, means, or instructions for receiving a scaling factor for the selected CSI computation mode from the base station, where the CSI measurement may be scaled using the received scaling factor.

Some examples of the method, apparatuses, and non-transitory computer-readable medium described herein may further include operations, features, means, or instructions for identifying a precoder of the base station, the precoder based on a number of antenna ports in use by the base station, where the number of antenna ports in use by the base station may be fewer than a total number of antenna ports of the base station and using the precoder to receive one or more of: the downlink transmission or a second downlink transmission.

Some examples of the method, apparatuses, and non-transitory computer-readable medium described herein may further include operations, features, means, or instructions for determining a transport block size based on a rank of the downlink transmission and using the determined transport block size to receive one or more of: the downlink transmission or a second downlink transmission.

Some examples of the method, apparatuses, and non-transitory computer-readable medium described herein may further include operations, features, means, or instructions for receiving from the base station a first rank parameter associated with a transport block size and a second rank parameter indicating a transmission rank, determining the transport block size based on the received rank parameter and using the determined transport block size and the indicated transmission rank to receive one or more of: the downlink transmission or a second downlink transmission.

Some examples of the method, apparatuses, and non-transitory computer-readable medium described herein may further include operations, features, means, or instructions for receiving from the base station a transport block size scaling factor, determining a transport block size based on the transport block size scaling factor and using the determined transport block size to receive one or more of: the downlink transmission or a second downlink transmission.

Some examples of the method, apparatuses, and non-transitory computer-readable medium described herein may further include operations, features, means, or instructions for using, based on the CSI computation mode, STBC/SFBC to receive one or more of: the downlink transmission or a second downlink transmission.

In some examples of the method, apparatuses, and non-transitory computer-readable medium described herein, one or more of the downlink transmission or a second downlink transmission may include operations, features, means, or instructions for mapping different portions of a code block of the data transmission to different transmit layers, mapping the different transmit layers to frequency and time resources and using the mapping of the different portions of the code block and the different transmit layers to receive the transport block.

Some examples of the method, apparatuses, and non-transitory computer-readable medium described herein may further include operations, features, means, or instructions for adjusting a measured pathloss of the base station based on the base station operating according to the EIRP constraint and setting an uplink power for a random access procedure with the base station based on the scaling.

Some examples of the method, apparatuses, and non-transitory computer-readable medium described herein may further include operations, features, means, or instructions for receiving an offset parameter from the base station, where adjusting the measured pathloss may be based on the received offset parameter.

A method of wireless communications is described. The method may include selecting a CSI computation mode for a wireless channel based on an EIRP constraint at the base station, performing a downlink transmission to a UE over the wireless channel, the downlink transmission indicating the CSI computation mode for the wireless channel, transmitting a set of one or more CSI-RSs over the wireless channel in accordance with the EIRP constraint, and receiving from the UE a CSI report based on the selected CSI computation mode and the transmitted set of CSI-RSs.

An apparatus for wireless communications is described. The apparatus may include a processor, memory in electronic communication with the processor, and instructions stored in the memory. The instructions may be executable by the processor to cause the apparatus to select a CSI computation mode for a wireless channel based on an EIRP constraint at the base station, perform a downlink transmission to a UE over the wireless channel, the downlink transmission indicating the CSI computation mode for the wireless channel, transmit a set of one or more CSI-RSs over the wireless channel in accordance with the EIRP constraint, and receive from the UE a CSI report based on the selected CSI computation mode and the transmitted set of CSI-RSs.

Another apparatus for wireless communications is described. The apparatus may include means for selecting a CSI computation mode for a wireless channel based on an EIRP constraint at the base station, performing a downlink transmission to a UE over the wireless channel, the downlink transmission indicating the CSI computation mode for the wireless channel, transmitting a set of one or more CSI-RSs over the wireless channel in accordance with the EIRP constraint, and receiving from the UE a CSI report based on the selected CSI computation mode and the transmitted set of CSI-RSs.

A non-transitory computer-readable medium storing code for wireless communications is described. The code may include instructions executable by a processor to select a CSI computation mode for a wireless channel based on an EIRP constraint at the base station, perform a downlink transmission to a UE over the wireless channel, the downlink transmission indicating the CSI computation mode for the wireless channel, transmit a set of one or more CSI-RSs over the wireless channel in accordance with the EIRP constraint, and receive from the UE a CSI report based on the selected CSI computation mode and the transmitted set of CSI-RSs.

Some examples of the method, apparatuses, and non-transitory computer-readable medium described herein may further include operations, features, means, or instructions for generating an indication of the CSI computation mode, where the downlink transmission includes the indication of the CSI computation mode.

Some examples of the method, apparatuses, and non-transitory computer-readable medium described herein may further include operations, features, means, or instructions for transmitting the scaling factor to the UE.

Some examples of the method, apparatuses, and non-transitory computer-readable medium described herein may further include operations, features, means, or instructions for identifying a precoder of the base station, the precoder based at least in on part on a number of antenna ports in use by the base station, where the number of antenna ports in use by the base station may be fewer than a total number of base station antenna ports.

Some examples of the method, apparatuses, and non-transitory computer-readable medium described herein may further include operations, features, means, or instructions for determining a transport block size based on a rank of the downlink transmission and using the determined transport block size to transmit one or more of: the downlink transmission or a second downlink transmission.

Some examples of the method, apparatuses, and non-transitory computer-readable medium described herein may further include operations, features, means, or instructions for determining a transport block size, transmitting to the UE a first rank parameter associated with the determined transport block size and a second rank parameter indicating a transmission rank and using the determined transport block size and the indicated transmission rank to transmit one or more of: the downlink transmission or a second downlink transmission.

Some examples of the method, apparatuses, and non-transitory computer-readable medium described herein may further include operations, features, means, or instructions for determining a transport block size, transmitting to the UE a transport block size scaling factor based on the determined transport block size and using the determined transport block size to transmit one or more of: the downlink transmission or a second downlink transmission.

Some examples of the method, apparatuses, and non-transitory computer-readable medium described herein may further include operations, features, means, or instructions for using, based on the CSI computation mode, STBC/SFBC to transmit one or more of: the downlink transmission or a second downlink transmission.

In some examples of the method, apparatuses, and non-transitory computer-readable medium described herein, one or more of the downlink transmission or a second downlink transmission may include operations, features, means, or instructions for mapping different portions of a code block of the transport block to different transmit layers, mapping the different transmit layers to frequency and time resources and using the mapping of the different portions of the code block and the different transmit layers to transmit the transport block.

Some examples of the method, apparatuses, and non-transitory computer-readable medium described herein may further include operations, features, means, or instructions for transmitting a pathloss offset parameter to the UE based on the EIRP constraint.

DETAILED DESCRIPTION

Figure 1:
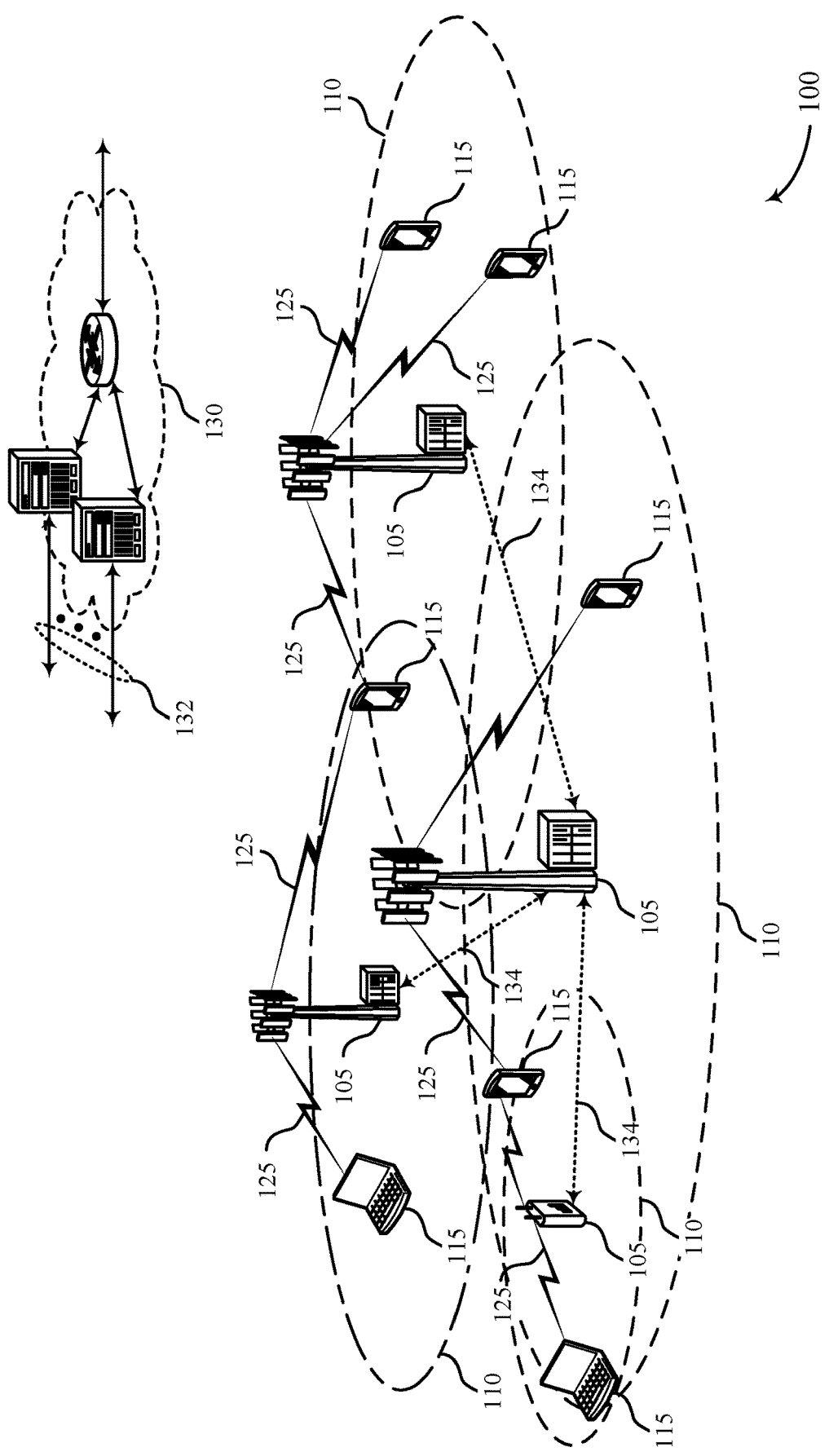
FIG. 1 illustrates an example of a system for wireless communications that supports CSI computation for EIRP-constrained transmissions in accordance with aspects of the present disclosure.

In some cases, the effective isotropic radiated power (EIRP) of a multi-antenna array may be defined by a government body or regulatory agency (e.g., Federal Communications Commission (FCC)), and may be a function of the antenna configuration and the data multiplexing scheme. In some cases, the EIRP for a multi-antenna array may be expressed by the sum of all conducted power across all antenna elements, the element gain, and the directional gain of antenna array. It should be noted that the EIRP for a single antenna equals the total power radiated by a hypothetical isotropic antenna so as to attain the same signal strength as the actual source in the direction of the antenna's strongest beam. That is, the EIRP of a transmitter is the product of a transmitted power and an antenna gain.

In some cases, transmitted signals may be considered to be correlated if one or more criteria are satisfied. For instance, if the same digital data is transmitted from two or more antennas (or antenna elements) in a given symbol period, independent of their respective coding and phase shifts, or, if correlation exists between two or more transmitted signals at any frequency and/or time delay, or, if multiple transmitters focus energy in a given direction, transmitter output signals may be considered to be correlated. Additionally, or alternatively, if the transmitter operating mode combines correlated and uncorrelated techniques, the output signals may be considered correlated. In some cases, signals transmitted in one or more of the following modes may be considered correlated, fixed or adaptive transmit beamforming mode (e.g., phased array modes, closed loop multiple input multiple output (MIMO) modes. Transmitter Adaptive Antenna modes, Maximum Ratio Transmission (MRT) modes, Statistical Eigen Beamforming (EBF) modes, etc.). Cyclic Delay Diversity or Cyclic Shift Diversity (CSD) modes, including modes used in Wireless LAN (WLAN) systems (e.g., 802.11n). In some cases, in cyclic delay diversity (CDD) modes, each transmit antenna may carry the same digital data with a different cyclic delay. In some circumstances, transmitted signals may be highly correlated at certain frequencies, and lower at others. In some cases, the correlation may be dependent on the time delay (e.g., lower correlation at zero time delay). In some cases, correlations may also be dependent on one or more bandwidths specified (e.g., by the FCC) for in-band Power Spectral Density (PSD) measurements. For instance, correlation may be higher over bandwidths subject to reductions in PSD when the directional gain exceeds a threshold. In some examples, STBC, and/or spatial multiplexing-MIMO may be considered to be uncorrelated schemes.

In some examples, regulatory guidance may impose a total power limit, and/or a PSD limit. In some cases, such limits may be based in part on frequency band in use, unlicensed or licensed spectrum, etc. In some aspects, EIRP limits may be specified per unit bandwidth (e.g., 1 megahertz (MHz) bandwidth). In one example, assuming a user equipment (UE) allocation exceeds 1 MHz bandwidth (e.g., more than 1 resource block (RB) at 60 kilohertz (kHz) subcarrier spacing), EIRP limitations may be applied on a per RB basis.

In some circumstances, for a particular UE computing and/or reporting Channel State Information (CSI), EIRP constraints may be accounted for in order to improve reporting accuracy, as well as optimize uplink power. For example, the base station or network may use the reported CSI in order to indicate an uplink power for the UE. In some cases, the CSI report may contain quality information including Channel Quality Information (CQI), precoding matrix indicator (PMI), rank indicator (RI), etc. In some cases, CSI reporting may be performed periodically (e.g., using Physical Uplink Control Channel (PUCCH)), or aperiodically (e.g., using Physical Uplink Shared Channel (PUSCH)). In some cases, for example, when Rank R=1, a received vector y may be expressed in terms of a channel transmission matrix H, vector x, and a noise vector n. In some cases, x may be a represented by the total input power (P) and an input vector s for each antenna. In some cases, for a normal operating mode (i.e., no EIRP constraint, or when the base station is not transmitting using full power), the signal to noise interference ratio (SINR) may be expressed as a function of the total transmit power (P), Noise ($N_o$) and a transmission matrix H.

In one example, when R=1, and precoder is [1 1 1 1], the SINR may be:

$$\frac{P|(h_1 + h_2 + h_3 + h_4)|^2}{4N_0} \quad (1)$$

In a second example, when R=1, and precoder is [1 −1 1 −1], the SINR may be:

$$\frac{P|(h_1 - h_2 + h_3 - h_4)|^2}{4N_0} \quad (2)$$

In some examples, the base station may be transmitting under EIRP constraints. In such cases, beamforming may be taken into account. For instance, for R=1:

$$R = 1, \text{Precoder} = \left(\frac{1}{2}\right)[1111], SINR = \frac{P|(h_1 + h_2 + h_3 + h_4)|^2}{16N_0} \quad (3)$$

$$R = 1, \text{Precoder} = \frac{1}{\sqrt{2}}[1010], SINR = \frac{P|(h_1 + h_3)|^2}{8N_0} \quad (4)$$

$$R = 1, \text{Precoder} = [1000], SINR = \frac{P|h_1|^2}{4N_0} \quad (5)$$

In some cases, a UE may be configured with an EIRP-constrained CSI reporting mode based on peak to average power ratio (PAPR) and error vector magnitude (EVM) requirements within certain jurisdictions, a desired communication range, or any other power limiting factors. In one example, a base station may be configured to transmit at a lower power than a maximum allowed EIRP if a short communication range (e.g., indoor deployment) is desired. In some cases, limiting the transmit power (e.g., <36 decibel-milliwatts (dBm)) may serve to mitigate interference experienced by other devices in the vicinity.

In some cases, a UE may employ different modes of CSI reporting based on explicit signaling (e.g., Radio Resource Control (RRC)) from the base station, or path loss measured at the UE. In some cases, the base station may configure, via a Radio Resource Management (RRM) report triggering event, a path loss threshold value for a certain cell. In such cases, if the UE measured path loss exceeds the threshold (e.g., on a beam, a group of beams, or average over beams), the base station may trigger deployment of an EIRP-constrained CSI reporting mode. In some aspects, the UE may compensate for the added path loss in its uplink transmissions, for instance, based on power backoff at the base station.

In some cases, the base station may determine when an EIRP limit is reached, and may signal the UE to enable an EIRP-constrained reporting mode. It should be noted that in a typical operating mode (i.e., no EIRP constraints), the base station may operate at maximum power. Further, the base station may be configured to optimize the time, frequency, and/or spatial use of the transmission mode (e.g., via rate control). In some cases, the base station may be configured to implement power control (e.g., UE transparent).

In some cases, the base station may signal a scaling factor to account for a transmit power backoff in EIRP-constrained mode, reduce the scheduled modulation and coding scheme (MCS) (e.g., modulation depth) and increase the scheduled rank, modify the mapping scheme used for downlink (e.g., Physical Downlink Shared Channel (PDSCH), or NR-PDSCH) transmissions, provide an offset applicable for EIRP-constrained scenarios, or a combination thereof, as further described with reference to FIGS. 3-6. In some other cases, the base station may switch to a different transmission scheme (e.g., STBC, or SFBC). In some cases, the network or base station may introduce antenna port selection, for example, while utilizing a codebook based precoding scheme. For instance, the base station may select a subset of possible codebooks to specify for port selection, which may be based in part on the number of antennas exceeding a threshold. That is, to compensate for a smaller scaling factor (i.e., for the precoding matrix) under EIRP constraints, the base station may only use a subset of antennas since the scaling factor is inversely proportional to the number of transmitting antennas. In some cases, and as further described with reference to while operating in EIRP-constrained mode, the payload size may be calculated to be independent of the number of layers used. In such cases, the UE may utilize a combination of the number of layers used for TBS determination, and the number of actual transmission layers to compute/report CSI. In some other cases, non-orthogonal STBC schemes may be deployed, which may serve to optimize diversity and multiplexing, when the number of transmitting antennas exceeds a threshold.

In some cases, mapping for data transmissions (e.g., PDSCH) may be modified, for example, while operating in EIRP-constrained mode. For instance, conventional techniques and sequences for mapping the NR-PDSCH may be based on layer first, then precoding, then frequency-time resources for each codeblock. In some other cases, the mapping sequence may include codeblock first, then total number of transmission layers, then frequency-time resources. In some cases, the alternate technique may alleviate concerns related to transmission power penalties. In some cases, one or more portions of the transport block (TB) may be generated based on a redundancy version ID i for layer i.

In some cases, the open path loss estimation for uplink power control may not match with the actual path loss experience on uplink. For example, the UE may estimate a larger path loss than needed due to lower transmit from the base station, and may subsequently compensate by transmitting with a higher than needed initial transmit power. In such cases, the base station may provide an offset, which may be applicable for EIRP-constrained scenarios. In some aspects, the uplink power setting for one or more transmissions (e.g., random access channel (RACH)), may be lower than an indicated downlink path loss estimation. In some cases, the offset value may be signaled in Remaining Minimum System Information (RMSI).

Aspects of the disclosure are initially described in the context of a wireless communications system. Aspects of the disclosure are further illustrated by and described with reference to process flows, apparatus diagrams, system diagrams, and flowcharts that relate to CSI computation for EIRP-constrained transmissions.

FIG. 1 illustrates an example of a wireless communications system 100 that supports CSI computation for EIRP-constrained transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the power attributes for transmissions from a multiple antenna array may be dependent on a number of antenna elements ($N_{ant}$), number of independent spatial streams ($N_{ss}$), and gain for a single antenna element (G). Further, antenna arrays may be classified into different categories based on the number of elements. In some cases, antenna arrays with $N_{ant}>1$ may be referred to as co-polarization arrays, and arrays with $N_{ant}=2$ may be referred to as X-polarization arrays. In some other cases, co-polarization+X-polarization may be used for referring to antenna arrays where $N_{ant}=2N$ (i.e., 2 sets of N co-polarization elements arranged in a X-polarization configuration).

In some cases, one or more types of data multiplexing schemes may be deployed to optimize throughput by providing additional data capacity. For instance, MIMO spatial multiplexing may transmit independent and separately encoded data signals (i.e., streams) from each of the multiple transmitting antennas. In such cases, the space dimension may be reused (or multiplexed) more than once. In some cases, $N_{ant}=N_{ss}>1$, which may be referred to as a pure spatial multiplexing scheme In some other cases, spatial multiplexing may be combined with beamforming and/or CDD. In such cases, the transmitter output signals may be considered to be correlated, and the number of antenna elements may exceed the number of spatial streams (i.e., $1<N_{ss}<N_{ant}$). In some examples, pure beamforming may refer to situations where there is a single spatial stream (i.e., $N_{ss}=1$).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, wireless communications system 100 may support CSI computation and reporting in order to adapt to changing channel conditions, such as UE mobility, fading experienced in an urban environment, etc. In some examples, regulatory guidance may impose a total power limit, and/or a PSD limit for transmissions from a base station 105. In some cases, such limits may be based in part on a frequency band in use, unlicensed or licensed spectrum, etc. In some aspects, EIRP limits may be specified per unit bandwidth (e.g., 1 MHz bandwidth). In one example, assuming a resource allocation for UE 115 exceeds 1 MHz bandwidth (e.g., more than 1 RB at 60 kHz subcarrier spacing), EIRP limitations may be applied on a per RB basis.

In some circumstances, for a particular UE 115 computing and/or reporting CSI, EIRP constraints may be accounted for in order to improve reporting accuracy, as well as optimize uplink power. For instance, a UE 115 may employ different modes of CSI reporting based on explicit signaling (e.g., RRC), or path loss measured at the UE 115. In some cases, the base station 105 may signal a scaling factor to account for a transmit power backoff in EIRP-constrained mode, reduce the scheduled MCS (e.g., modulation depth) and increase the scheduled rank, modify the mapping scheme used for downlink (e.g., PDSCH, or NR-PDSCH) transmissions, provide an offset applicable for EIRP-constrained scenarios, or a combination thereof. In some other cases, the base station 105 may switch to a different transmission scheme (e.g., STBC, or SFBC).

In some cases, the network or base station 105 may utilize antenna port selection (i.e., to comply with EIRP limits) while utilizing a codebook based precoding scheme. For instance, the base station 105 may select a subset of possible codebooks to specify for port selection when the number of antennas exceeds a threshold. That is, under EIRP constraints the base station 105 may only use a subset of antenna ports in order to compensate for the smaller scaling factor (i.e., inverse proportionality between antenna elements, and scaling factor). In some cases, the payload size calculated may be independent of the number of layers used. In such cases, the UE 115 may utilize a combination of the number of layers used for TBS determination, and the number of actual transmission layers to compute/report CSI. In some aspects, the TBS size may be adjusted while operating in EIRP-constrained mode so as to optimize the energy/symbol. In some cases, non-orthogonal STBC schemes may be deployed, which may serve to optimize diversity and multiplexing, when the number of transmitting antennas exceeds a threshold.

Figure 2:
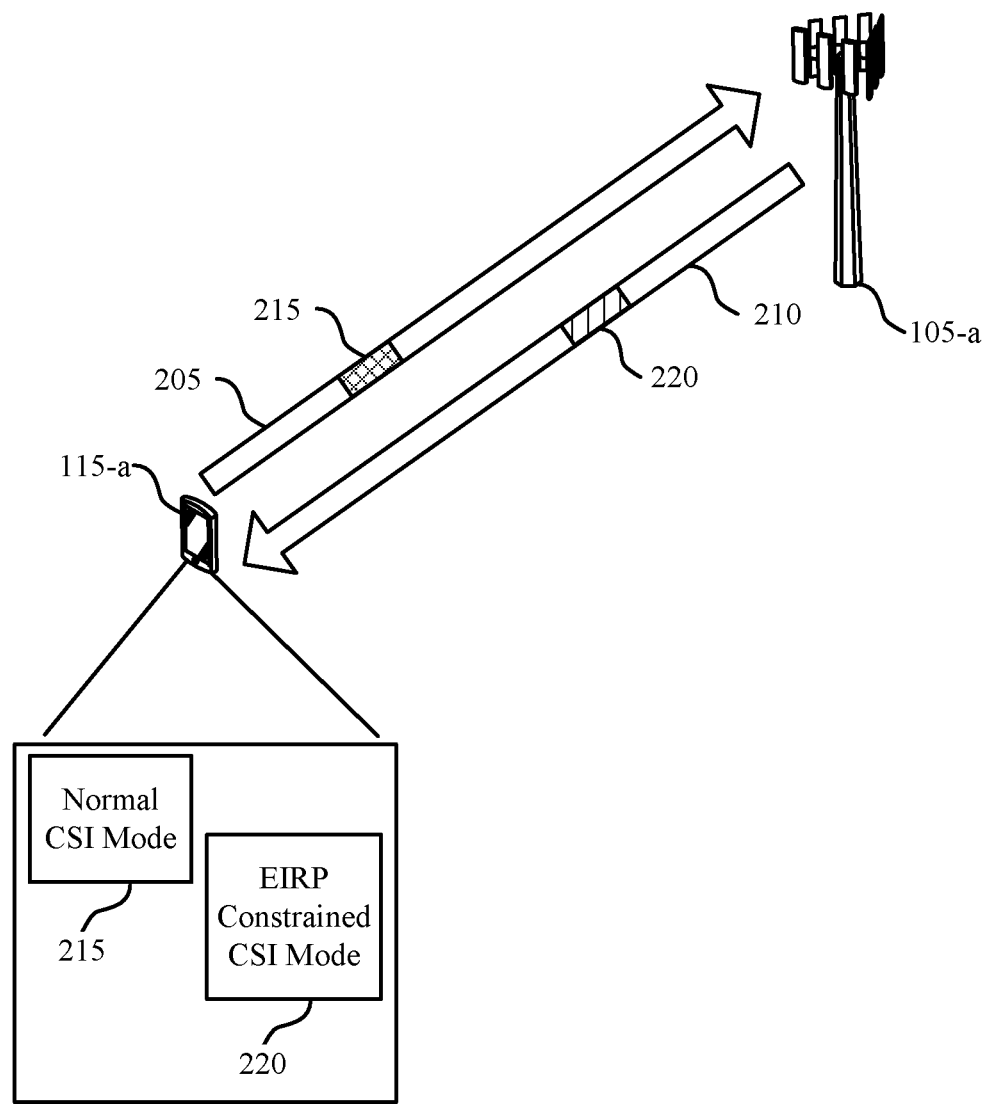
FIG. 2 illustrates an example of a wireless communications system that supports CSI computation for EIRP-constrained transmissions in accordance with aspects of the present disclosure.

FIG. 2 illustrates an example of a wireless communications system 200 that supports CSI computation for EIRP-constrained transmissions in accordance with aspects of the present disclosure. In some examples, wireless communications system 200 may implement aspects of wireless communication system 100. The wireless communications system 200 may include UE 115-*a*, and base station 105-*a*, which may be examples of the UE 115 and base station 105 described with reference to FIG. 1. As shown, UE 115-*a* may communicate with base station 105-*a* via uplink 205, and downlink 210. The wireless communications system 200 may also operate according to a radio access technology (RAT) such as a fifth generation (5G) NR RAT, although techniques described herein may be applied to any RAT.

In some cases, wireless communications system 200 may support the use of multiple antenna arrays, beamforming, spatial multiplexing, or a combination, for transmissions between base station 105-*a* and UE 115-*a*. In some cases, the power attributes for transmissions from a multiple antenna array may be dependent on a number of antenna elements (Nat), number of independent spatial streams ($N_{ss}$), and gain for a single antenna element (G). Further, antenna arrays may be classified into different categories based on the number of elements. In some cases, antenna arrays with $N_{ant}>1$ may be referred to as co-polarization arrays, and arrays with $N_{ant}=2$ may be referred to as cross (X)-polarization arrays. In some other cases, antenna arrays employing a combination of co-polarization and X-polarization may be used, where $N_{ant}=2N$ (i.e., 2 sets of N co-polarization elements arranged in a X-polarization configuration).

In some cases, one or more types of data multiplexing schemes may be deployed to optimize throughput by providing additional data capacity. For instance, MIMO spatial multiplexing may transmit independent and separately encoded data signals (i.e., streams) from each of the multiple transmitting antennas. In such cases, the space dimension may be reused (or multiplexed) more than once. In some cases, $N_{ant}=N_{ss}>1$, which may be referred to as a pure spatial multiplexing scheme. In some other cases, spatial multiplexing may be combined with beamforming and/or CDD. In such cases, the transmitter output signals may be considered to be correlated, and the number of antenna elements may exceed the number of spatial streams (i.e., $1<N_{ss}<N_{ant}$). In some examples, pure beamforming may refer to situations where there is a single spatial stream (i.e., $N_{ss}=1$).

In some cases, the EIRP of a multi-antenna array may be regulated by a government body or agency (e.g., FCC), and may be a function of the antenna configuration and the data multiplexing scheme. In some cases, the EIRP for a multi-antenna array may be expressed by the sum of conducted power across all antenna elements, element gain, and directional gain of antenna array. It should be noted that the EIRP for a single antenna equals the total power radiated by a hypothetical isotropic antenna so as to attain the same signal strength as the actual source in the direction of the antenna's strongest beam. That is, the EIRP of a transmitter is the product of a transmitted power and an antenna gain. In some cases, the directional gain of an antenna array may differ based on the transmission configuration (e.g., correlated/uncorrelated signals, $N_{ss}$, etc.) and the antenna configuration (e.g., co-polarization, X-polarization, $N_{ant}$, etc.).

In some cases, transmitted signals may be considered to be correlated if one or more criteria are satisfied. For instance, if the same digital data is transmitted from two or more antennas (or antenna elements) in a given symbol period, independent of their respective coding and phase shifts, or, if correlation exists between two or more transmitted signals at any frequency and/or time delay, or, if multiple transmitters focus energy in a given direction, transmitter output signals may be considered to be correlated. Additionally, or alternatively, if the transmitter operating mode combines correlated and uncorrelated techniques, then the output signals may be considered correlated. In some cases, signals transmitted in one or more of the following modes may be considered correlated, fixed or adaptive transmit beamforming mode (e.g., phased array modes, closed loop MIMO modes, Transmitter Adaptive Antenna modes, MRT modes, Statistical EBF modes, etc.), CDD or CSD modes, including modes used in WLAN systems (e.g., 802.11n). In some cases in CDD modes, each transmit antenna may carry the same digital data with a different cyclic delay. In some circumstances, transmitted signals may be highly correlated at certain frequencies, and lower at others. In some cases, the correlation may be dependent on the time delay (e.g., lower correlation at zero time delay).

The correlations may also be dependent on one or more bandwidths specified (e.g., by the FCC) for in-band PSD measurements. For instance, correlation may be higher over bandwidths subject to reductions in PSD when the directional gain exceeds a threshold. In some examples, STBC, and/or spatial multiplexing-MIMO may be considered uncorrelated schemes.

In some examples, regulatory bodies (e.g., FCC, or any other equivalent for other jurisdictions) may impose a total power limit, and/or a PSD limit. In these cases, such limits may be based in part on the frequency band in use, if the band uses unlicensed or licensed spectrum, etc. In some aspects, EIRP limits may be set as a function of frequency (e.g., per 1 MHz bandwidth). In one example, assuming a UE 115 allocation exceeds 1 MHz bandwidth (e.g., more than 1 RB at 60 kHz subcarrier spacing), EIRP limitations may be applied on a per RB basis.

In some circumstances, UE 115-a may compute and/or report CSI, and EIRP constraints may be considered in order to improve reporting accuracy, as well as optimize uplink power. For example, the base station 105-a may use the reported CSI in order to indicate an uplink power for the UE 115-a. In some cases, the CSI report may contain quality information including CQI, PMI, RI, etc. In some cases, CSI reporting may be performed periodically (e.g., using PUCCH), or aperiodically (e.g., PUSCH).

In some cases, the UE 115-a may transmit a rank indication in order to indicate the SINR experienced at the UE. Further, the base station 105-a may select a transmission scheme (e.g., transmit diversity, spatial multiplexing, etc.) based on the rank indication. In these cases, the base station 105-a may switch to transmit diversity (i.e., same data stream via multiple antennas) if the SINR is poor (below a certain threshold), in order to improve reliability. Conversely, the base station may switch to MIMO with spatial multiplexing if the SINR is at or above a certain threshold, which may improve reliability. In some cases, the rank may equal the lower number between the number of transmit antennas and the number of receive antennas.

In some cases, for example, when Rank R=1, a received vector y may be expressed in terms of a channel transmission matrix H, vector x, and a noise vector n. Further, x may be a represented by the total input power (P) and an input vector s for each antenna. For a normal operating mode (i.e., no EIRP constraint, or when the base station 105-a is not transmitting using full power), the SINR may be expressed as a function of the total transmit power (P), Noise ($N_o$) and a transmission matrix H. In one example, when R=1, and precoder is [1 1 1 1], the SINR may be described by the following equation:

$$\frac{P|(h_1 + h_2 + h_3 + h_4)|^2}{4N_0} \quad (6)$$

In a second example, when R=1, and precoder is [1 −1 1 −1], the SINR may be described by the following equation:

$$\frac{P|(h_1 - h_2 + h_3 - h_4)|^2}{4N_0} \quad (7)$$

In the above equations, the numbers in the precoder matrix define the coefficients of each of $h_n$, respectively. In some examples, the base station 105-a may be transmitting under EIRP constraints. In such cases, beamforming may be taken into account. For instance, for R=1:

$$R = 1, \text{Precoder} = \left(\frac{1}{2}\right)[1111], \quad (8)$$
$$SINR = \frac{P|(h_1 + h_2 + h_3 + h_4)|^2}{16N_0}$$

$$R = 1, \text{Precoder} = \frac{1}{\sqrt{2}}[1010], SINR = \frac{P|(h_1 + h_3)|^2}{8N_0} \quad (9)$$

$$R = 1, \text{Precoder} = [1000], SINR = \frac{P|h_1|^2}{4N_0} \quad (10)$$

In some cases, the UE 115-a may be configured with an EIRP-constrained CSI reporting mode, which may be based on a maximum PAPR and/or EVM, desired communication range, or any other power limiting factors. In one example, the base station 105-a may be configured to transmit at a lower power than a maximum allowed EIRP if a short communication range (e.g., indoor deployment) is desired. In some cases, limiting the transmit power (e.g., <36 dBm) may serve to mitigate interference experienced by other wireless devices in the vicinity.

In some cases, UE 115-a may employ different modes of CSI reporting based on explicit signaling (e.g., RRC) from the base station 105-a, or path loss measured at the UE 115-a, as further described with reference to FIGS. 3-6.

In some cases, the base station 105-a may configure, via a Radio Resource Management (RRM) report triggering event, a path loss threshold value for a certain cell. In such cases, if the UE 115-a measured path loss exceeds the threshold (e.g., on a beam, a group of beams, or average over beams), the base station may trigger deployment of an EIRP-constrained CSI reporting mode. In some aspects, the UE 115-a may compensate for the added path loss in its transmissions over uplink 205, for instance, based on power backoff at the base station 105-a.

In some cases, the base station 105-a may determine when an EIRP limit is reached, and may signal the UE 115-a, via downlink 210, to enable an EIRP-constrained CSI mode 220. It should be noted that in a normal CSI mode 215 (i.e., no EIRP constraints), the base station 105-a may operate at maximum power, and the UE 115-a may not need to account for power limits at the base station 105-a. That is, the base station 105-a may be configured to optimize the time, frequency, and/or spatial use of the transmission mode (e.g., via rate control). In some cases, the base station 105-a may be configured to implement power control that is transparent to the UE 115-a.

In some cases, the base station may signal a scaling factor to account for a transmit power backoff in EIRP-constrained mode, reduce the scheduled MCS) (e.g., modulation depth and increase the scheduled rank, modify the mapping scheme used for downlink (e.g., PDSCH, or NR-PDSCH) transmissions, provide an offset applicable for EIRP-constrained scenarios, or a combination thereof, as further described with reference to FIGS. 3-6. In some other cases, the base station may switch to a different transmission scheme (e.g., STBC, or SFBC).

In some cases, the network or base station may introduce antenna port selection, for example, while utilizing a codebook based precoding scheme. For instance, the base station may select a subset of possible codebooks to specify for port selection, which may be based in part on the number of antennas exceeding a threshold. That is, to compensate for a smaller scaling factor (i.e., for the precoding matrix) under EIRP constraints, the base station may only use a subset of antennas since the scaling factor is inversely proportional to the number of transmitting antennas. In some cases, and as further described with reference to operating in EIRP-constrained mode, the payload size may be calculated to be independent of the number of layers used. In such cases, the UE 115-a may utilize a combination of the number of layers used for TBS determination, and the number of actual transmission layers to compute/report CSI.

Figure 3:
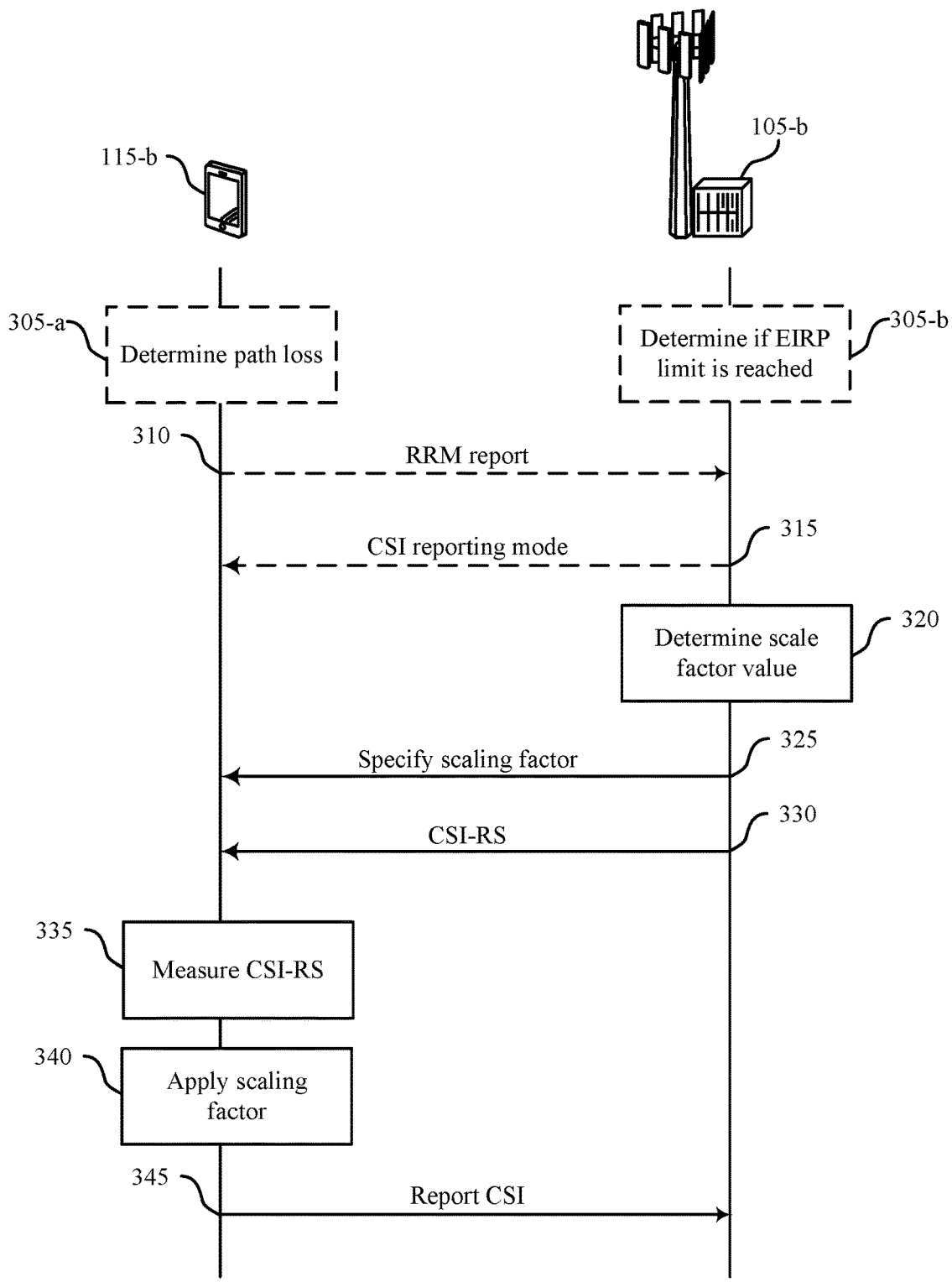
FIG. 3 illustrates an example of a process flow that supports CSI computation for EIRP-constrained transmissions in accordance with aspects of the present disclosure.

FIG. 3 illustrates an example of a process flow 300 that supports CSI computation for EIRP-constrained transmissions in accordance with aspects of the present disclosure. In some examples, process flow 300 may be implemented by aspects of wireless communication system 100 and/or 200. Process flow 300 may include a base station 105-b, and a UE 115-b. The base station 105-b may be an example of a base station 105 of FIG. 1 or 2, and the UE 115-b may be example of UEs 115 of FIG. 1 or 2. Initially, the base station 105-b may perform a connection establishment according to established connection establishment techniques. In some cases, the base station 105 and the UEs 115 may operate in mmW spectrum.

At 305-a, in some cases, the UE 115-b may determine a path loss based in part on a transmission received from base station 105-b (not shown). In some cases, the UE 115-b may transmit a RRM report (or any other measurement report) at 310, indicating the path loss.

Additionally, or alternatively, at 305-b, the base station 105-b may determine if an EIRP limit is reached. As previously described, in some cases, the base station 105-b may have configured, via a RRM report triggering event, a path loss threshold value. In such cases, if the path loss reported by UE 115-b at 310 exceeds the threshold (e.g., on a beam, a group of beams, or average over beams), the base station 105-b may trigger deployment of an EIRP-constrained CSI reporting mode.

In some cases, at 315, the base station 105-b may transmit an indication of the CSI reporting mode (i.e., normal mode, or EIRP-constrained mode) to use to the UE 115-b.

At 320, the base station 105-b may determine a scale factor value, such as $$\frac{\sqrt{N_{ss}}}{\sqrt{N_{ant}}},$$

for each precoding matrix for Type 1 single, and multiple panel codebooks. $N_{ss}$ may refer to the number of spatial streams also known as the rank of the transmission, and $N_{ant}$ may refer to the total number of antenna ports used at the base station 105-b.

At 325, the base station 105-b may specify the scaling factor to the UE 115-b. Further, at 330, the base station 105-b may transmit one or more CSI-RSs to the UE 115-b for channel estimation.

In some cases, at 335, the UE 115-b may measure and compute the CSI-RS received at 330. At 340, the UE 115-b may apply the scaling factor received at 325 to a precoding matrix estimated (or received) from transmissions from the base station 105-b. In some cases, the precoding matrix may be based on the antenna configuration, and one or more weighting parameters used in downlink transmissions. For instance, the precoding matrix may imply a set of weights applied during the precoding process. In some cases, the base station 105-b may signal the precoding matrix used (e.g., via downlink control information (DCI)). In some examples, the UE 115-b may multiply the scaling factor to the precoding matrix, and then evaluate the best precoding matrix At 345, the UE 115-b may report the CSI to the base station 105-b. In some aspects, the UE 115-b may utilize the reported CSI for uplink power control, for instance, by compensating for added path loss in an EIRP-constrained mode.

Figure 4:
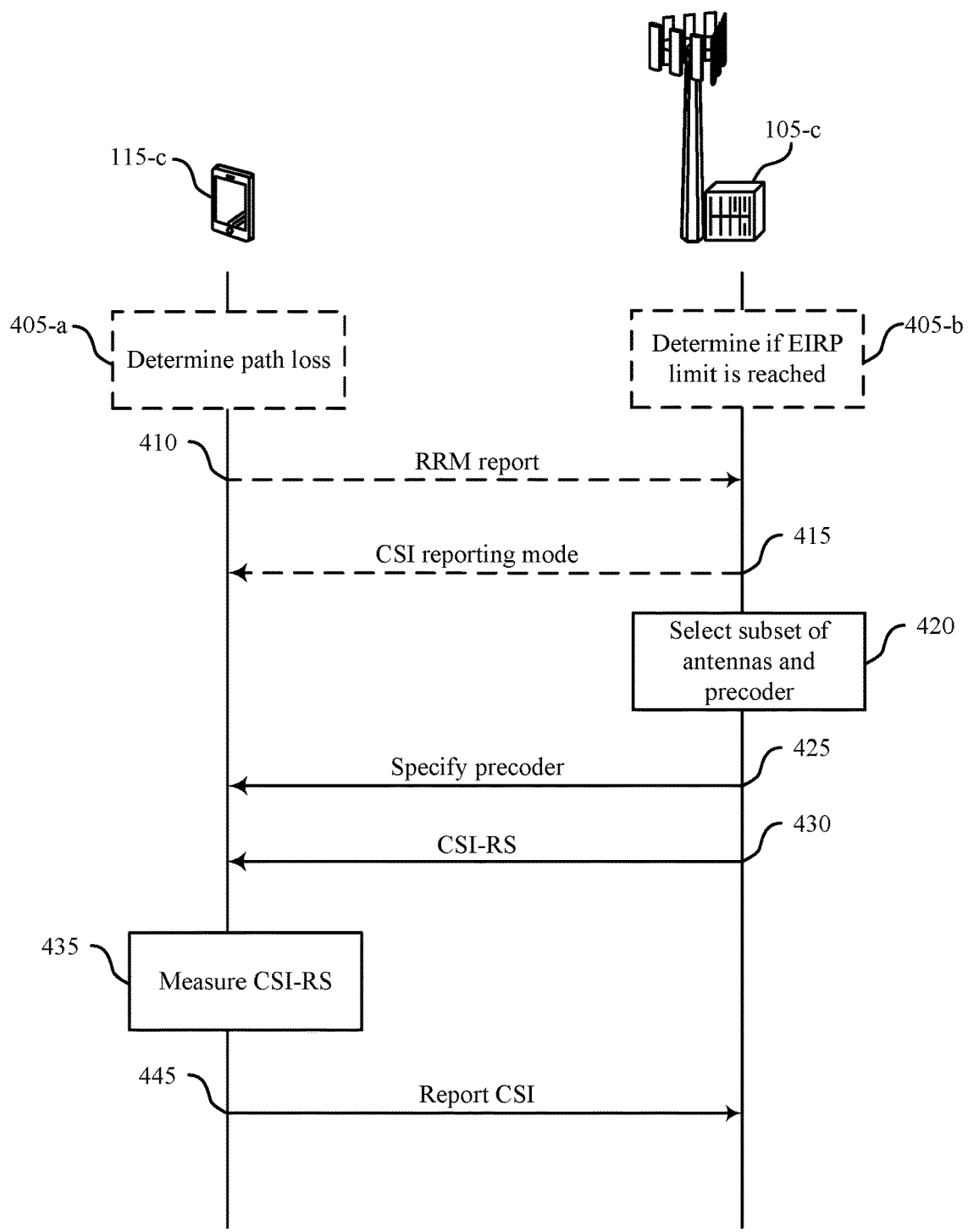
FIG. 4 illustrates an example of a process flow that supports CSI computation for EIRP-constrained transmissions in accordance with aspects of the present disclosure.

FIG. 4 illustrates an example of a process flow 400 that supports CSI computation for EIRP-constrained transmissions in accordance with aspects of the present disclosure. In some examples, process flow 400 may be implemented by aspects of wireless communication system 100 and/or 200. Process flow 400 may include a base station 105-c, and a UE 115-c. The base station 105-c may be an example of a base station 105 of FIG. 1 or 2, and the UE 115 may be example of UEs 115 of FIG. 1 or 2. Initially, the base station 105-c may perform a connection establishment according to established connection establishment techniques. In some cases, the base station 105 and the UEs 115 may operate in mmW spectrum.

At 405-a, in some cases, the UE 115-c may determine a path loss based in part on a transmission received from base station 105-c (not shown). In some cases, the UE 115-c may transmit a RRM report (or any other measurement report) at 410, indicating the path loss.

Additionally, or alternatively, at 405-b, the base station 105-c may determine if an EIRP limit is reached. In some cases, the base station 105-c may have configured, via a RRM report triggering event, a path loss threshold value. In such cases, if the path loss reported by UE 115-c at 410 exceeds the threshold (e.g., on a beam, a group of beams, or average over beams), the base station 105-c may trigger deployment of an EIRP-constrained CSI reporting mode. In some cases, at 415, the base station 105-c may transmit an indication of the CSI reporting mode (i.e., normal mode, or EIRP-constrained mode) to the UE 115-c.

At 420, the base station 105-c may introduce antenna port selection, for example, while utilizing a codebook based precoding scheme. In some examples, the base station 105-c may down-select, and use only a subset of antennas for codebook selection. In some cases, the base station 105-c may select a subset of possible codebooks for port selection, which may be based on the number of antennas exceeding a threshold. As previously described, using a subset of antenna elements, as opposed to all, may help compensate for a smaller scaling factor (i.e., for the precoding matrix) under EIRP constraints. In some aspects, the scaling factor is inversely proportional to the number of transmitting antennas.

In one example, if $|h_1|>|h_3|>|h_2|>|h_4|$, then choosing [1 0 1 0] precoder may be more efficient than $$\frac{1}{\sqrt{2}}$$

[1 1 1 1]. Further, for the case of 4 transmit antennas and rank 1, the port selection precoders may be as described below:

[1 0 0 0], [0 1 0 0], [0 0 1 0], [0 0 0 1], [1 0 x 0], [1 0 0 x],

[1 x 0 0], [0 1 x 0], [0 1 0 x], [0 0 1 x], x=±1, ±j

In some cases, current techniques for codebook selection may be based on Discrete Fourier Transform (DFT) matrices, and may utilize all antenna elements. Thus, a large number of antenna elements may be inefficient, especially while operating under EIRP constraints.

In some cases, at 425, the base station 105-c may specify the precoder to UE 115-c. In some cases, the precoder may be based on a number of antenna ports in use by the base station 105-c, where the number of antenna ports in use by the base station 105-c is fewer than a total number of antenna ports of the base station 105-c.

At 430, the UE 115-c may receive CSI-RS transmissions from the base station 105-c. At 435, the UE 115-c may measure the received CSI-RS based in part on the precoder received at 425. At 445, the UE 115-c may report the measured CSI-RS to the base station 105-c. Further, the UE 115-c may utilize the measured CSI-RS for uplink power control.

Figure 5:
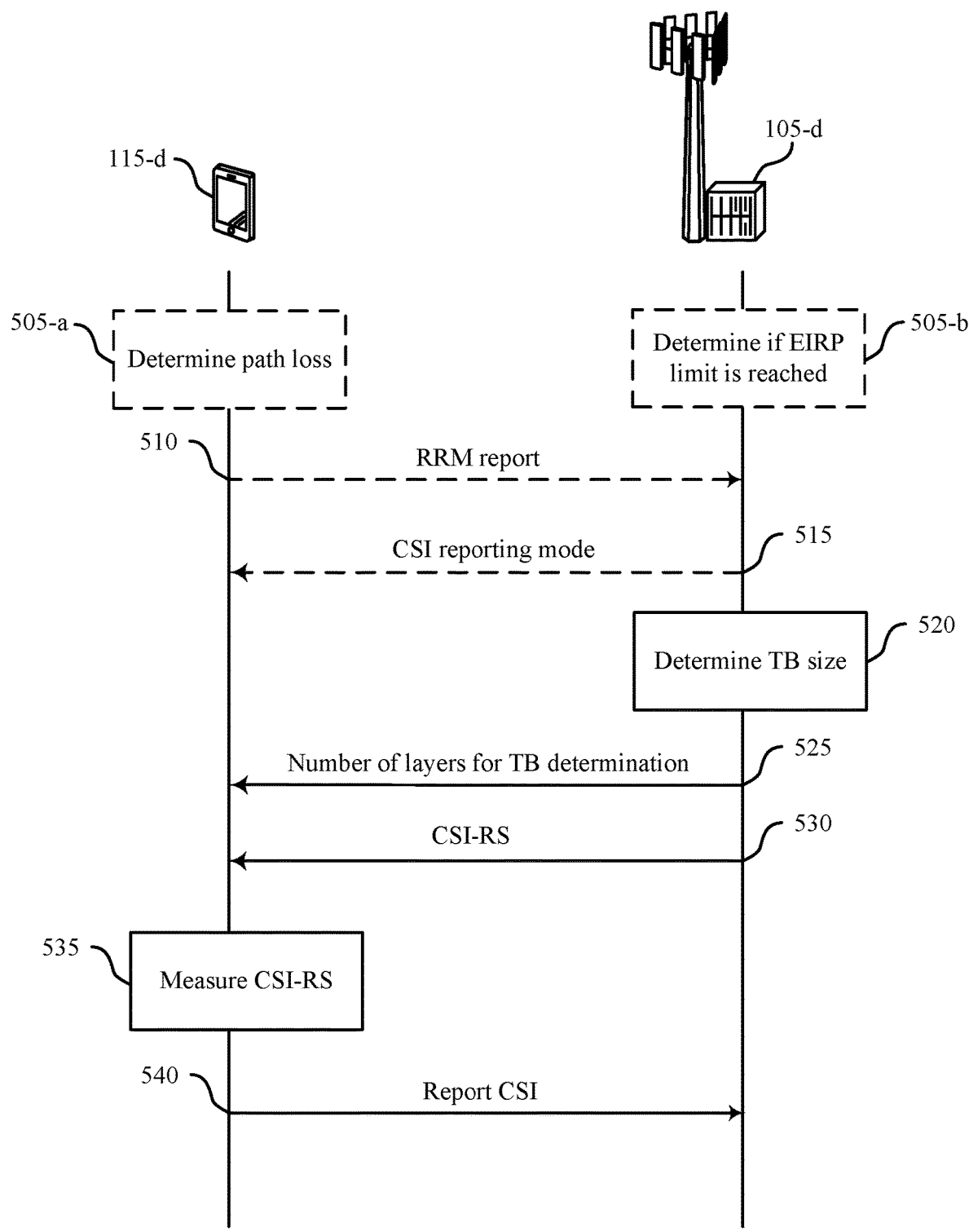
FIG. 5 illustrates an example of a process flow that supports CSI computation for EIRP-constrained transmissions in accordance with aspects of the present disclosure.

FIG. 5 illustrates an example of a process flow 500 that supports CSI computation for EIRP-constrained transmissions in accordance with aspects of the present disclosure. In some examples, process flow 500 may be implemented by aspects of wireless communication system 100 and/or 200. Process flow 500 may include a base station 105-d, and a UE 115-d. The base station 105-d may be an example of a base station 105 of FIG. 1 or 2, and the UE 115 may be example of UEs 115 of FIG. 1 or 2. Initially, the base station 105-d may perform a connection establishment according to established connection establishment techniques. In some cases, the base station 105 and the UEs 115 may operate in mmW spectrum.

At 505-a, in some cases, the UE 115-d may determine a path loss based in part on a transmission received from a base station 105. In some cases, the UE 115-d may transmit a RRM report (or any other measurement report) at 510, indicating the path loss.

Additionally, or alternatively, at 505-b, the base station 105-d may determine if an EIRP limit is reached. In some cases, the base station 105-d may have configured, via a RRM report triggering event, a path loss threshold value. In such cases, if the path loss reported by UE 115-d at 510 exceeds the threshold (e.g., on a beam, a group of beams, or average over beams), the base station 105-d may trigger deployment of an EIRP-constrained CSI reporting mode. In some cases, at 515, the base station 105-d may transmit an indication of the CSI reporting mode (i.e., normal mode, or EIRP-constrained mode) to the UE 115-d.

At 520, the base station 105-d may determine a TB size, which may be calculated to be independent of the number of layers used. In some aspects, this may serve to optimize the reliability for a transmission. For instance, decreasing the number of bits in a TB may allow for a higher energy per symbol.

At 525, the base station 105-d may transmit the number of layers used for TB size determination, in addition to the number of layers used for the actual transmission. In some cases, the TB size may be determined based on a configured value of a number of layers, which may be different from the number of layers used for transmission. In some cases, the base station 105-d may also transmit a TBS scale factor. In some cases, the indications may be transmitted in DCI over a physical downlink control channel (PDCCH) (or NR-PDCCH).

At 530, the base station 105-d may transmit one or more CSI-RS to the UE 115-d. Further, at 535, the UE 115-d may measure and compute one or more CSI-RSs, based in part on the steps at 520 and 525. In some cases, the UE 115-d may utilize a combination of the number of layers used for TB determination, and the number of actual transmission layers to compute/report CSI.

At 540, the UE 115-d may transmit a CSI report to the base station 105-d in an uplink transmission.

Figure 6:
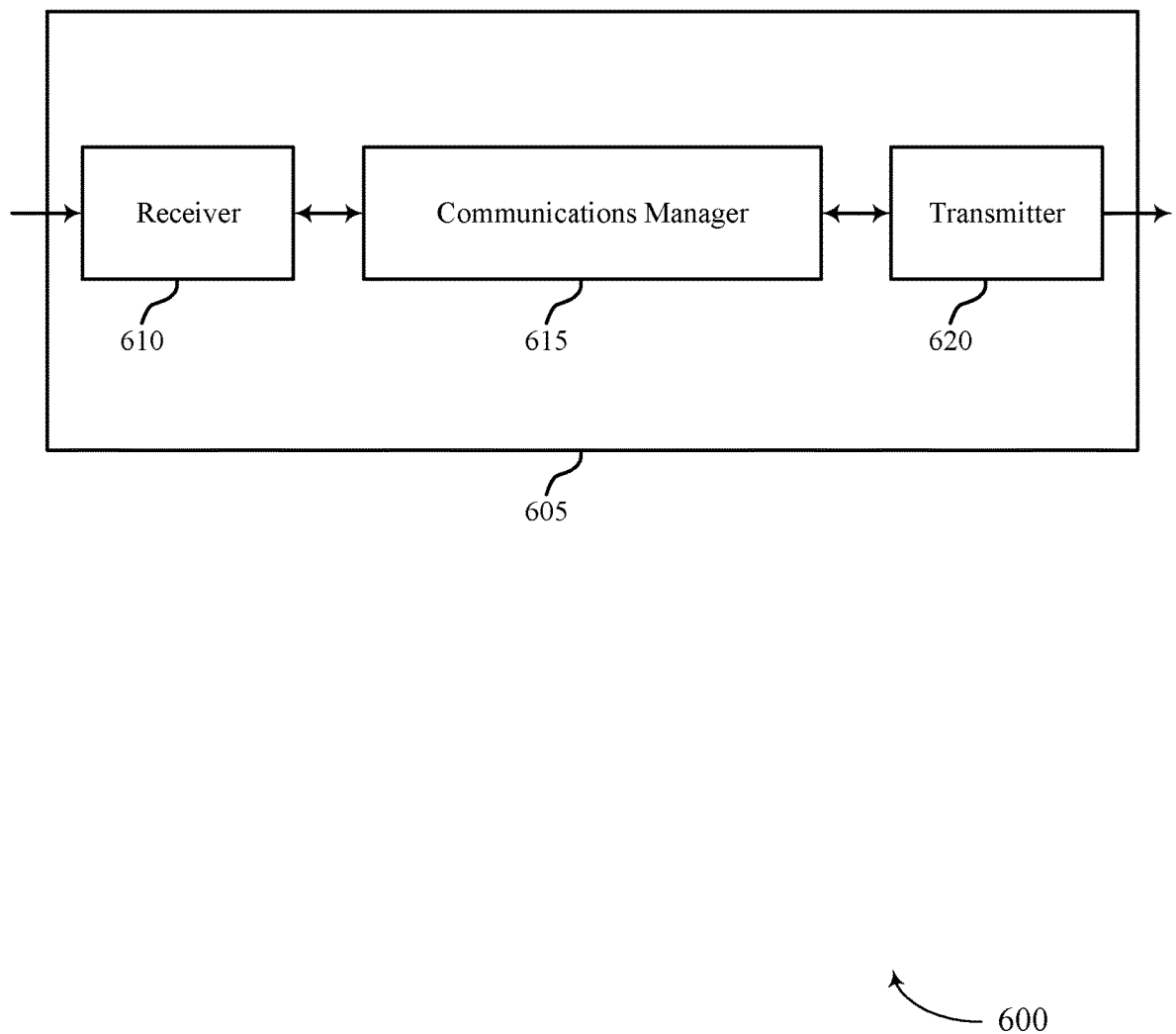
FIGS. 6 and 7 show block diagrams of devices that support CSI computation for EIRP-constrained transmissions in accordance with aspects of the present disclosure.

FIG. 6 shows a block diagram 600 of a device 605 that supports CSI computation for EIRP-constrained transmissions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to CSI computation for EIRP-constrained transmissions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a downlink transmission from a base station over a wireless channel, measure a set of one or more CSI-RSs from the base station to obtain a CSI measurement, transmit a CSI report to the base station based on the selected CSI computation mode and the CSI measurement, and select, based on the received downlink transmission, a CSI computation mode for the wireless channel, where the CSI computation mode is based on an EIRP constraint. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615 as described herein may be implemented to realize one or more potential advantages. One implementation may improve the efficiency of a UE 115, as the actions performed by the communications manager 615 may down-select the number of antennas, which may lead to a smaller scaling factor for a smaller number of antennas. Another implementation that may improve the efficiency of the UE 115 may be that the communications manager 615 may select a subset of codebooks for a higher number of antennas, or may select different scaling factors for the precoding matrix.

In some examples, the communications manager 615 described herein may be implemented as a chipset of a wireless modem, and the receiver 610 and the transmitter 620 may be implemented as sets of analog components (e.g., amplifiers, filters, phase shifters, antennas, etc.). The wireless modem may obtain and decode signals from the receiver 610 over a receive interface, and may output signals for transmission to the transmitter 620 over a transmit interface.

Figure 7:
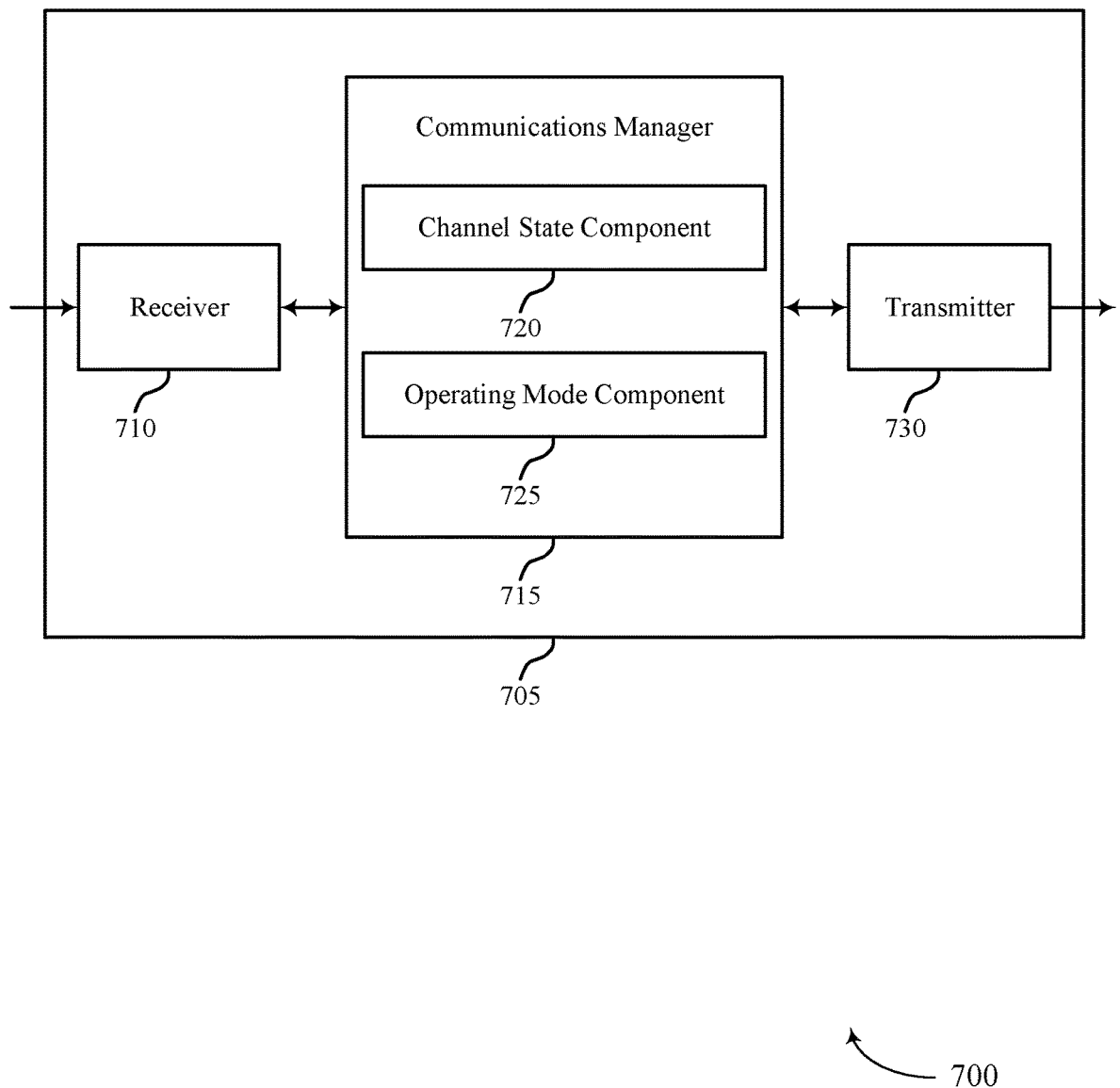

FIG. 7 shows a block diagram 700 of a device 705 that supports CSI computation for EIRP-constrained transmissions in accordance with aspects of the present disclosure. The device 705 may be an example of aspects of a device 605 or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to CSI computation for EIRP-constrained transmissions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a channel state component 720 and an operating mode component 725. The communications manager 715 may be an example of aspects of the communications manager 910 described herein.

The channel state component 720 may receive a downlink transmission from a base station over a wireless channel, measure a set of one or more CSI-RSs from the base station to obtain a CSI measurement, and transmit a CSI report to the base station based on the selected CSI computation mode and the CSI measurement.

The operating mode component 725 may select, based on the received downlink transmission, a CSI computation mode for the wireless channel, where the CSI computation mode is based on an EIRP constraint.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
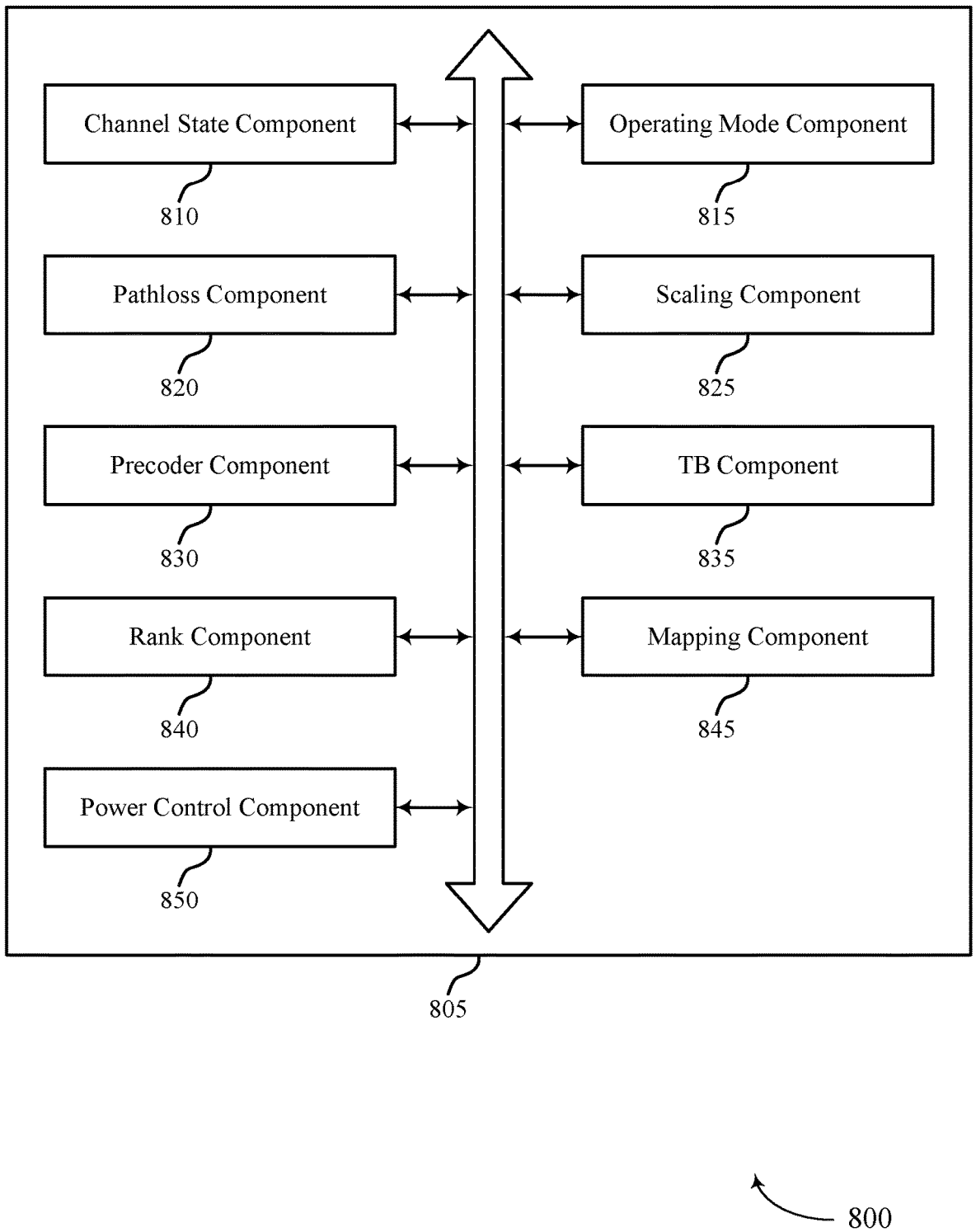
FIG. 8 shows a block diagram of a communications manager that supports CSI computation for EIRP-constrained transmissions in accordance with aspects of the present disclosure.

FIG. 8 shows a block diagram 800 of a communications manager 805 that supports CSI computation for EIRP-constrained transmissions in accordance with aspects of the present disclosure. The communications manager 805 may be an example of aspects of a communications manager 615, a communications manager 715, or a communications manager 910 described herein. The communications manager 805 may include a channel state component 810, an operating mode component 815, a pathloss component 820, a scaling component 825, a precoder component 830, a TB component 835, a rank component 840, a mapping component 845, and a power control component 850. Each of these modules may communicate, directly or indirectly, with one another (e.g., via one or more buses).

The channel state component 810 may receive a downlink transmission from a base station over a wireless channel. In some examples, the channel state component 810 may measure a set of one or more CSI-RSs from the base station to obtain a CSI measurement. In some examples, the channel state component 810 may transmit a CSI report to the base station based on the selected CSI computation mode and the CSI measurement. In some examples, the channel state component 810 may use the determined transport block size and the indicated transmission rank to receive one or more of: the downlink transmission or a second downlink transmission. In some examples, the channel state component 810 may use the determined transport block size to receive one or more of: the downlink transmission or a second downlink transmission. In some examples, the channel state component 810 may use, based on the CSI computation mode, STBC/SFBC to receive one or more of: the downlink transmission or a second downlink transmission.

The operating mode component 815 may select, based on the received downlink transmission, a CSI computation mode for the wireless channel, where the CSI computation mode is based on an EIRP constraint. In some examples, the operating mode component 815 may receive in the downlink transmission an indication of the CSI computation mode, where selecting the CSI computation mode is further based on the indication of the CSI computation mode. The pathloss component 820 may determine a pathloss of the downlink transmission, where selecting the CSI computation mode is further based on the pathloss of the downlink transmission. In some examples, the pathloss component 820 may adjust a measured pathloss of the base station based on the base station operating according to the EIRP constraint.

The scaling component 825 may scale the CSI measurement based on the selected CSI computation mode, where the CSI report is based on the scaled CSI measurement. In some examples, the scaling component 825 may receive a scaling factor for the selected CSI computation mode from the base station, where the CSI measurement is scaled using the received scaling factor. The precoder component 830 may identify a precoder of the base station, the precoder based on a number of antenna ports in use by the base station, where the number of antenna ports in use by the base station is fewer than a total number of antenna ports of the base station. In some examples, the precoder component 830 may use the precoder to receive one or more of: the downlink transmission or a second downlink transmission.

The TB component 835 may determine a transport block size based on a rank of the downlink transmission. In some examples, the TB component 835 may use the determined transport block size to receive one or more of: the downlink transmission or a second downlink transmission. In some examples, the TB component 835 may determine the transport block size based on the received rank parameter. In some examples, the TB component 835 may receive from the base station a transport block size scaling factor. In some examples, the TB component 835 may determine a transport block size based on the transport block size scaling factor. In some examples, the TB component 835 may use the mapping of the different portions of the code block and the different transmit layers to receive the transport block.

The rank component 840 may receive from the base station a first rank parameter associated with a transport block size and a second rank parameter indicating a transmission rank.

The mapping component 845 may map different portions of a code block of the data transmission to different transmit layers. In some examples, the mapping component 845 may map the different transmit layers to frequency and time resources.

The power control component 850 may set an uplink power for a random access procedure with the base station based on the scaling. In some examples, the power control component 850 may receive an offset parameter from the base station, where adjusting the measured pathloss is based on the received offset parameter.

Figure 9:
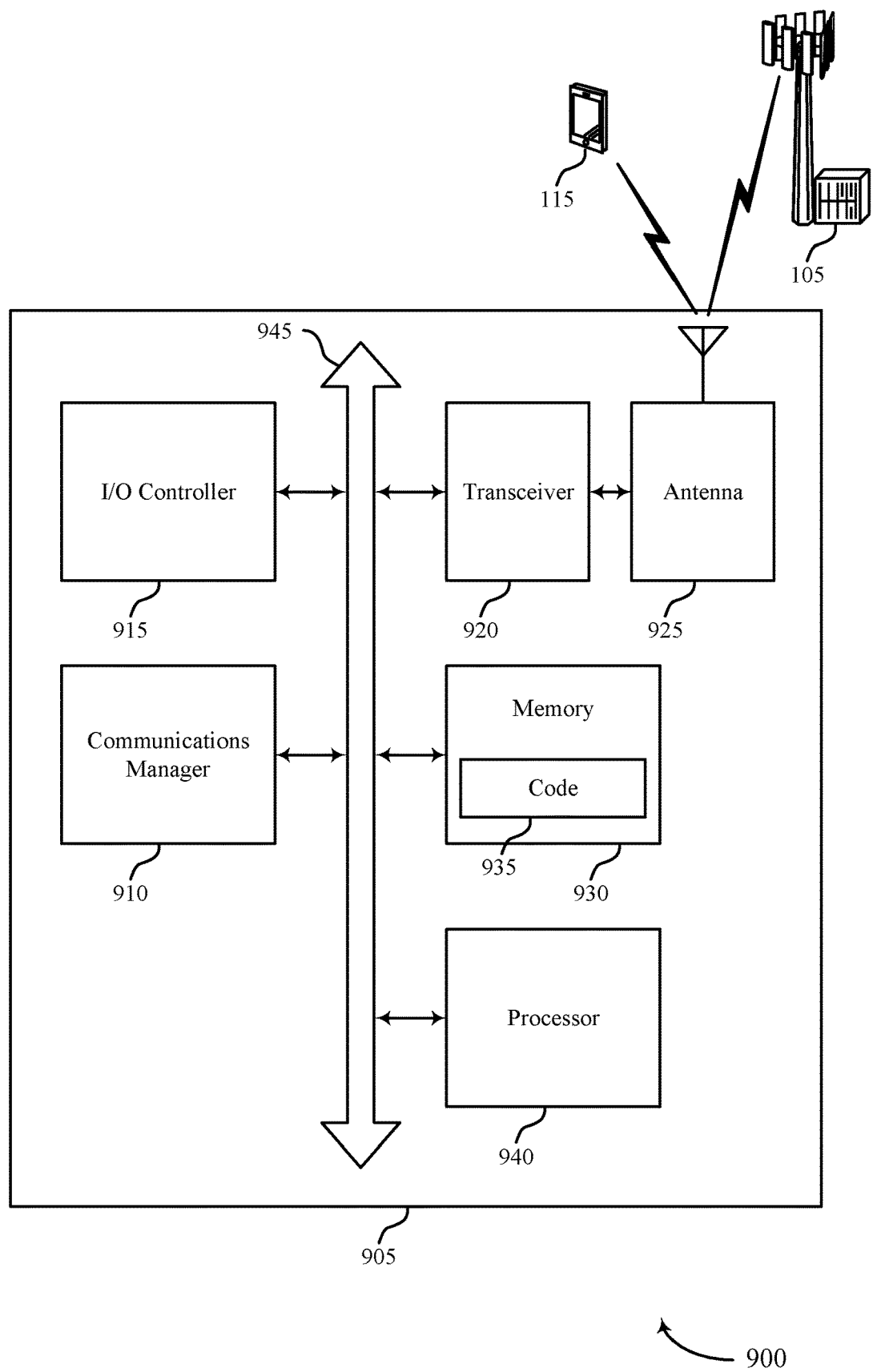
FIG. 9 shows a diagram of a system including a device that supports CSI computation for EIRP-constrained transmissions in accordance with aspects of the present disclosure.

FIG. 9 shows a diagram of a system 900 including a device 905 that supports CSI computation for EIRP-constrained transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a downlink transmission from a base station over a wireless channel, measure a set of one or more CSI-RSs from the base station to obtain a CSI measurement, transmit a CSI report to the base station based on the selected CSI computation mode and the CSI measurement, and select, based on the received downlink transmission, a CSI computation mode for the wireless channel, where the CSI computation mode is based on an EIRP constraint.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting CSI computation for EIRP-constrained transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The functions performed by a processor 940 and components in communication with the processor 940 may improve the efficiency of the functions of a UE 115. The functions performed by a processor 940 may also improve reporting accuracy and optimize uplink power, by executing code 935 to improve CSI reporting according to EIRP constraints as described herein.

Figure 10:
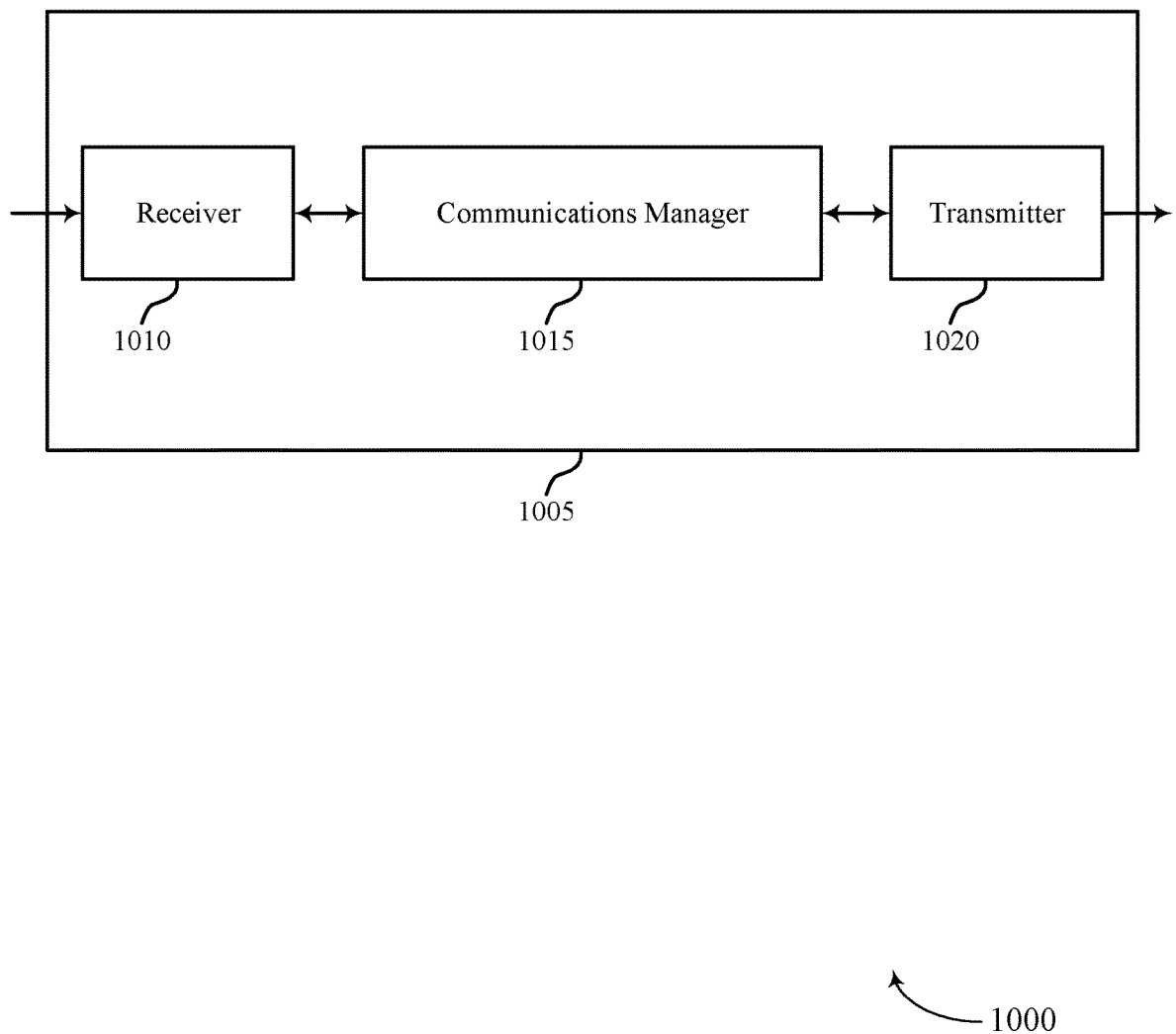
FIGS. 10 and 11 show block diagrams of devices that support CSI computation for EIRP-constrained transmissions in accordance with aspects of the present disclosure.

FIG. 10 shows a block diagram 1000 of a device 1005 that supports CSI computation for EIRP-constrained transmissions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to CSI computation for EIRP-constrained transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may select a CSI computation mode for a wireless channel based on an EIRP constraint at the base station, transmit a set of one or more CSI-RSs over the wireless channel in accordance with the EIRP constraint, receive from the UE a CSI report based on the selected CSI computation mode and the transmitted set of CSI-RSs, and perform a downlink transmission to a UE over the wireless channel, the downlink message indicating the CSI computation mode for the wireless channel. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
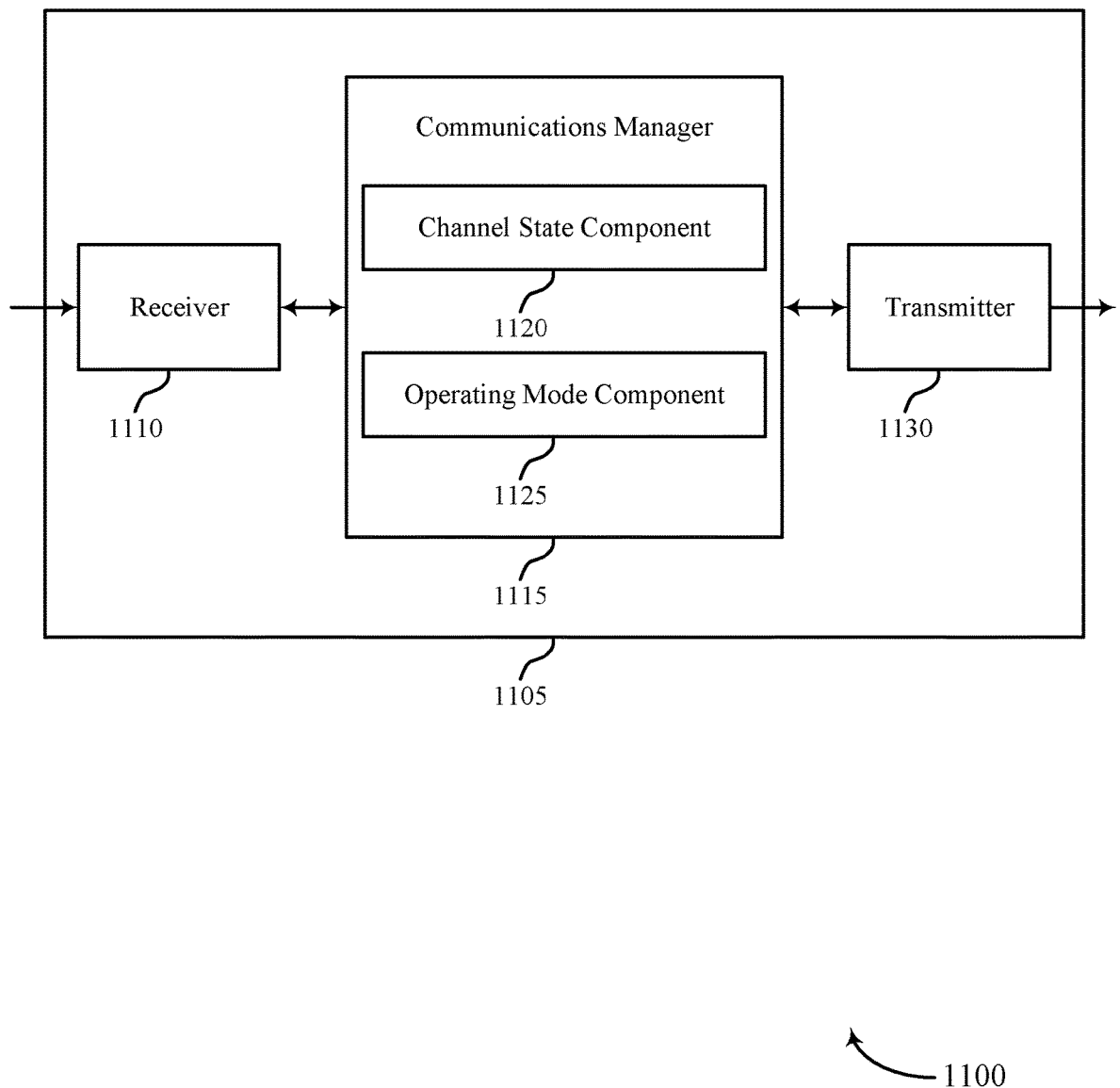

FIG. 11 shows a block diagram 1100 of a device 1105 that supports CSI computation for EIRP-constrained transmissions in accordance with aspects of the present disclosure. The device 1105 may be an example of aspects of a device 1005 or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to CSI computation for EIRP-constrained transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a channel state component 1120 and an operating mode component 1125. The communications manager 1115 may be an example of aspects of the communications manager 1310 described herein.

The channel state component 1120 may select a CSI computation mode for a wireless channel based on an EIRP constraint at the base station, transmit a set of one or more CSI-RSs over the wireless channel in accordance with the EIRP constraint, and receive from the UE a CSI report based on the selected CSI computation mode and the transmitted set of CSI-RSs.

The operating mode component 1125 may perform a downlink transmission to a UE over the wireless channel, the downlink message indicating the CSI computation mode for the wireless channel.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
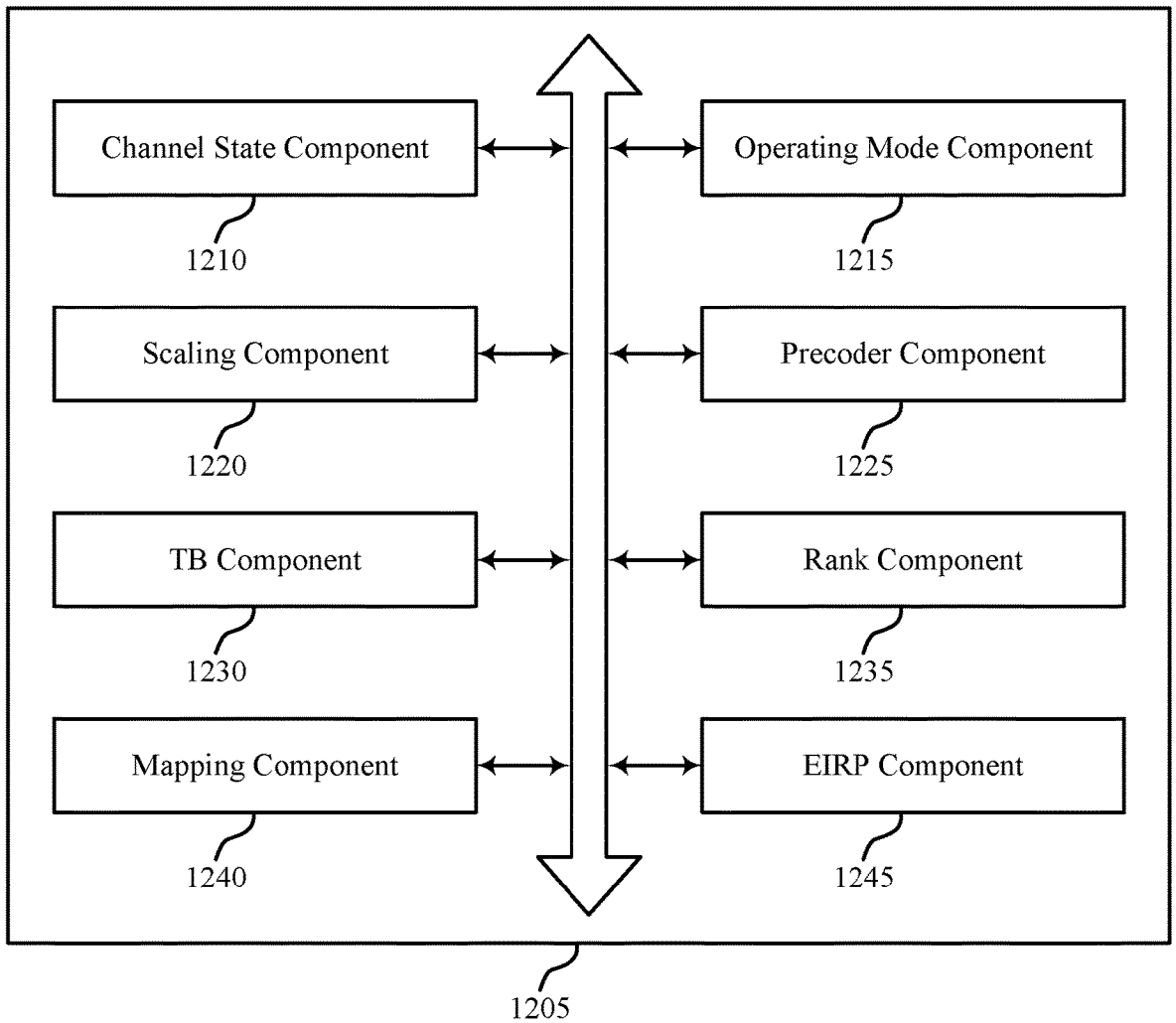
FIG. 12 shows a block diagram of a communications manager that supports CSI computation for EIRP-constrained transmissions in accordance with aspects of the present disclosure.

FIG. 12 shows a block diagram 1200 of a communications manager 1205 that supports CSI computation for EIRP-constrained transmissions in accordance with aspects of the present disclosure. The communications manager 1205 may be an example of aspects of a communications manager 1015, a communications manager 1115, or a communications manager 1310 described herein. The communications manager 1205 may include a channel state component 1210, an operating mode component 1215, a scaling component 1220, a precoder component 1225, a TB component 1230, a rank component 1235, a mapping component 1240, and an EIRP component 1245. Each of these modules may communicate, directly or indirectly, with one another (e.g., via one or more buses).

The channel state component 1210 may select a CSI computation mode for a wireless channel based on an EIRP constraint at the base station. In some examples, the channel state component 1210 may transmit a set of one or more CSI-RSs over the wireless channel in accordance with the EIRP constraint. In some examples, the channel state component 1210 may receive from the UE a CSI report based on the selected CSI computation mode and the transmitted set of CSI-RSs.

The operating mode component 1215 may trigger perform a downlink transmission to a UE over the wireless channel, the downlink message indicating the CSI computation mode for the wireless channel. In some examples, the operating mode component 1215 generates an indication of the CSI computation mode, where the downlink transmission includes the indication of the CSI computation mode. In some examples, the operating mode component 1215 may use, based on the CSI computation mode, STBC/SFBC to transmit one or more of: the downlink transmission or a second downlink transmission.

The scaling component 1220 may trigger transmitting the scaling factor to the UE. In some examples, the scaling component 1220 may transmit to the UE a transport block size scaling factor based on the determined transport block size.

The precoder component 1225 may identify a precoder of the base station, the precoder based at least in on part on a number of antenna ports in use by the base station, where the number of antenna ports in use by the base station is fewer than a total number of base station antenna ports.

The TB component 1230 may determine a transport block size based on a rank of the downlink transmission. In some examples, the TB component 1230 may use the determined transport block size to transmit one or more of: the downlink transmission or a second downlink transmission. In some examples, the TB component 1230 may determine a transport block size. In some examples, the TB component 1230 may use the determined transport block size and the indicated transmission rank to transmit one or more of: the downlink transmission or a second downlink transmission. In some examples, the TB component 1230 may use the mapping of the different portions of the code block and the different transmit layers to transmit the transport block.

The rank component 1235 may transmit to the UE a first rank parameter associated with the determined transport block size and a second rank parameter indicating a transmission rank.

The mapping component 1240 may map different portions of a code block of the transport block to different transmit layers. In some examples, the mapping component 1240 may map the different transmit layers to frequency and time resources.

The EIRP component 1245 may transmit a pathloss offset parameter to the UE based on the EIRP constraint.

Figure 13:
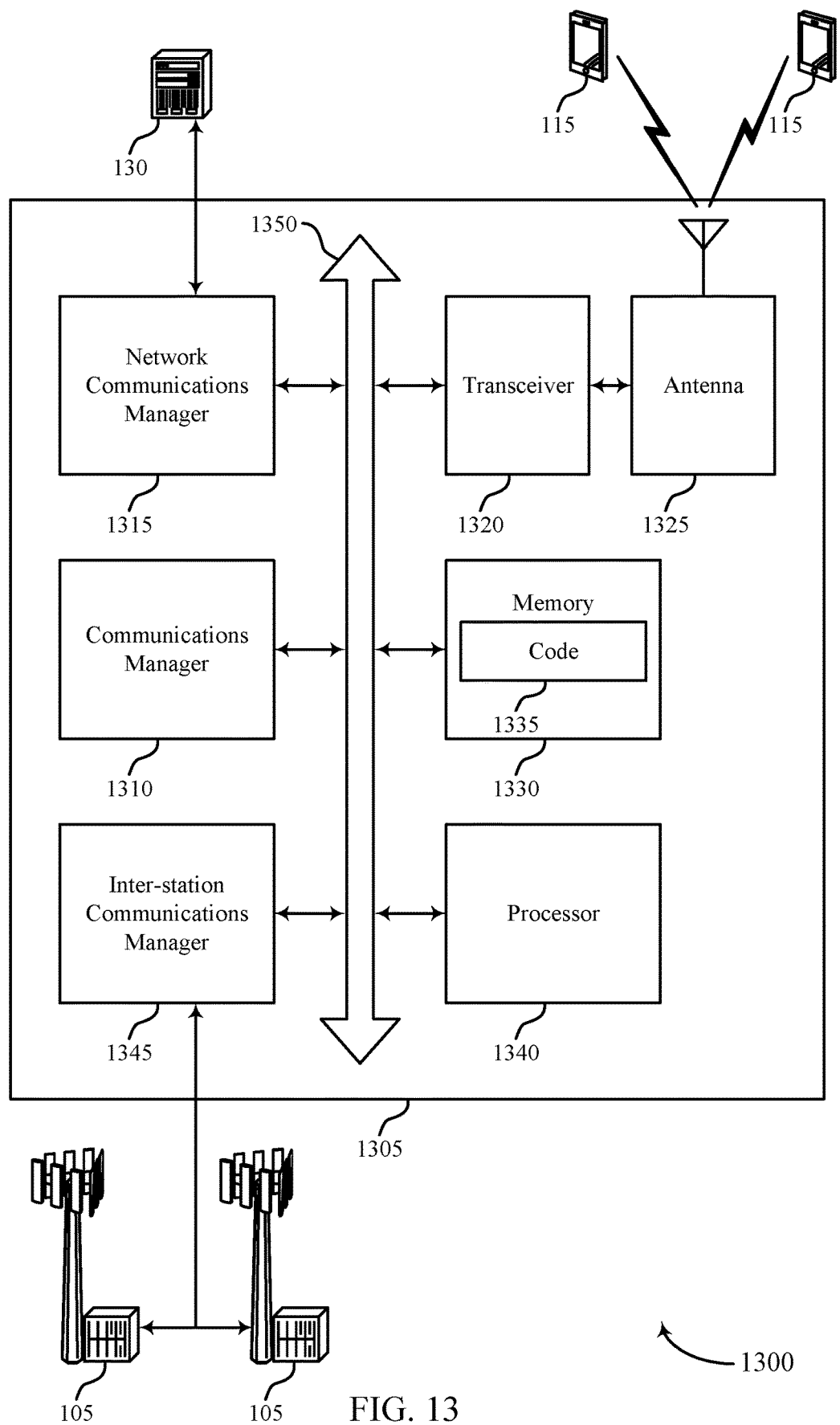
FIG. 13 shows a diagram of a system including a device that supports CSI computation for EIRP-constrained transmissions in accordance with aspects of the present disclosure.

FIG. 13 shows a diagram of a system 1300 including a device 1305 that supports CSI computation for EIRP-constrained transmissions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may select a CSI computation mode for a wireless channel based on an EIRP constraint at the base station, transmit a set of one or more CSI-RSs over the wireless channel in accordance with the EIRP constraint, receive from the UE a CSI report based on the selected CSI computation mode and the transmitted set of CSI-RSs, and perform a downlink transmission to a UE over the wireless channel, the downlink message indicating the CSI computation mode for the wireless channel.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include a hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting CSI computation for EIRP-constrained transmissions).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
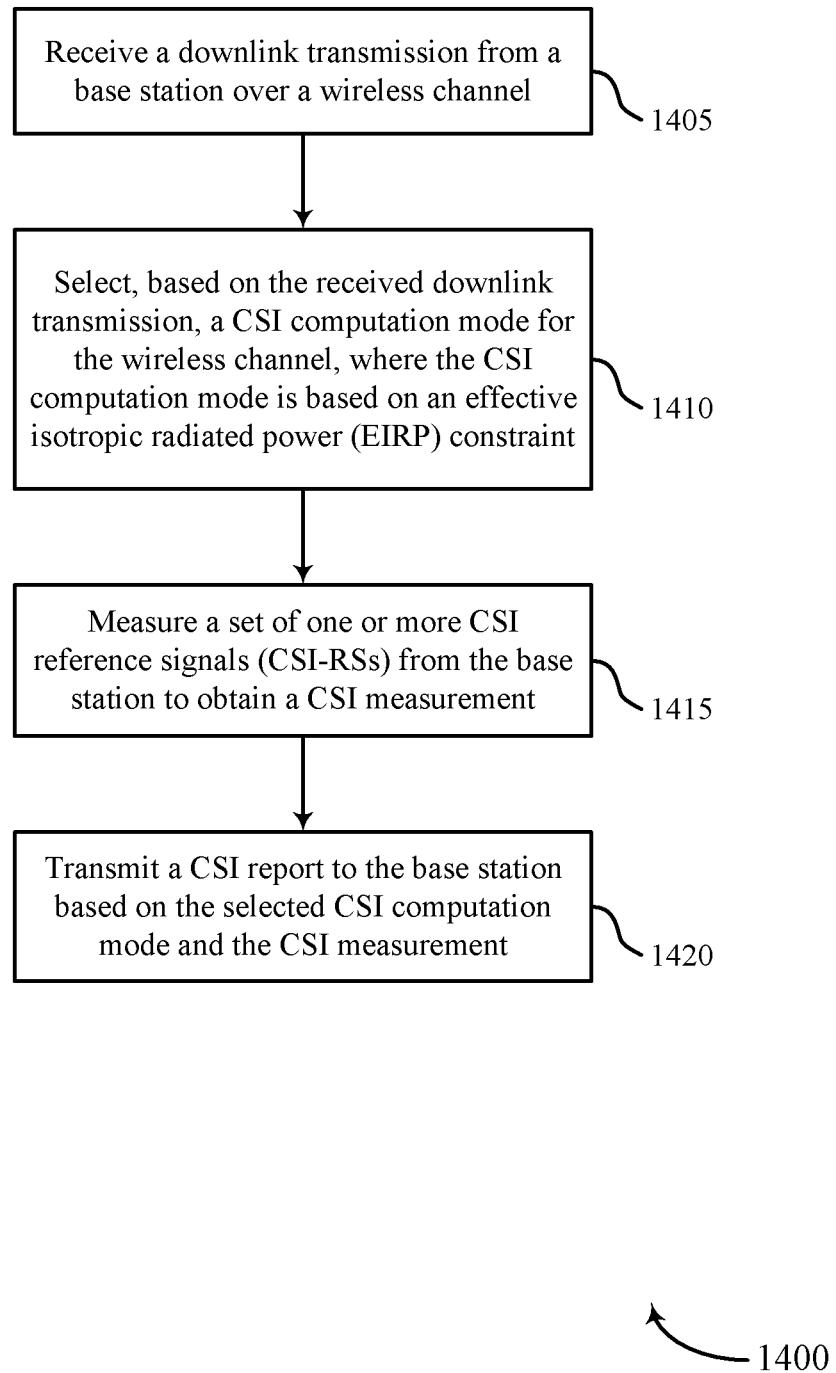
FIGS. 14 and 15 show flowcharts illustrating methods that support CSI computation for EIRP-constrained transmissions in accordance with aspects of the present disclosure.

FIG. 14 shows a flowchart illustrating a method 1400 that supports CSI computation for EIRP-constrained transmissions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1405, the UE may receive a downlink transmission from a base station over a wireless channel. The operations of 1405 may be performed according to the methods described herein. In some examples, aspects of the operations of 1405 may be performed by a channel state component as described with reference to FIGS. 6 through 9.

At 1410, the UE may select, based on the received downlink transmission, a CSI computation mode for the wireless channel, where the CSI computation mode is based on an EIRP constraint. The operations of 1410 may be performed according to the methods described herein. In some examples, aspects of the operations of 1410 may be performed by an operating mode component as described with reference to FIGS. 6 through 9.

At 1415, the UE may measure a set of one or more CSI-RSs from the base station to obtain a CSI measurement. The operations of 1415 may be performed according to the methods described herein. In some examples, aspects of the operations of 1415 may be performed by a channel state component as described with reference to FIGS. 6 through 9.

At 1420, the UE may transmit a CSI report to the base station based on the selected CSI computation mode and the CSI measurement. The operations of 1420 may be performed according to the methods described herein. In some examples, aspects of the operations of 1420 may be performed by a channel state component as described with reference to FIGS. 6 through 9.

Figure 15:
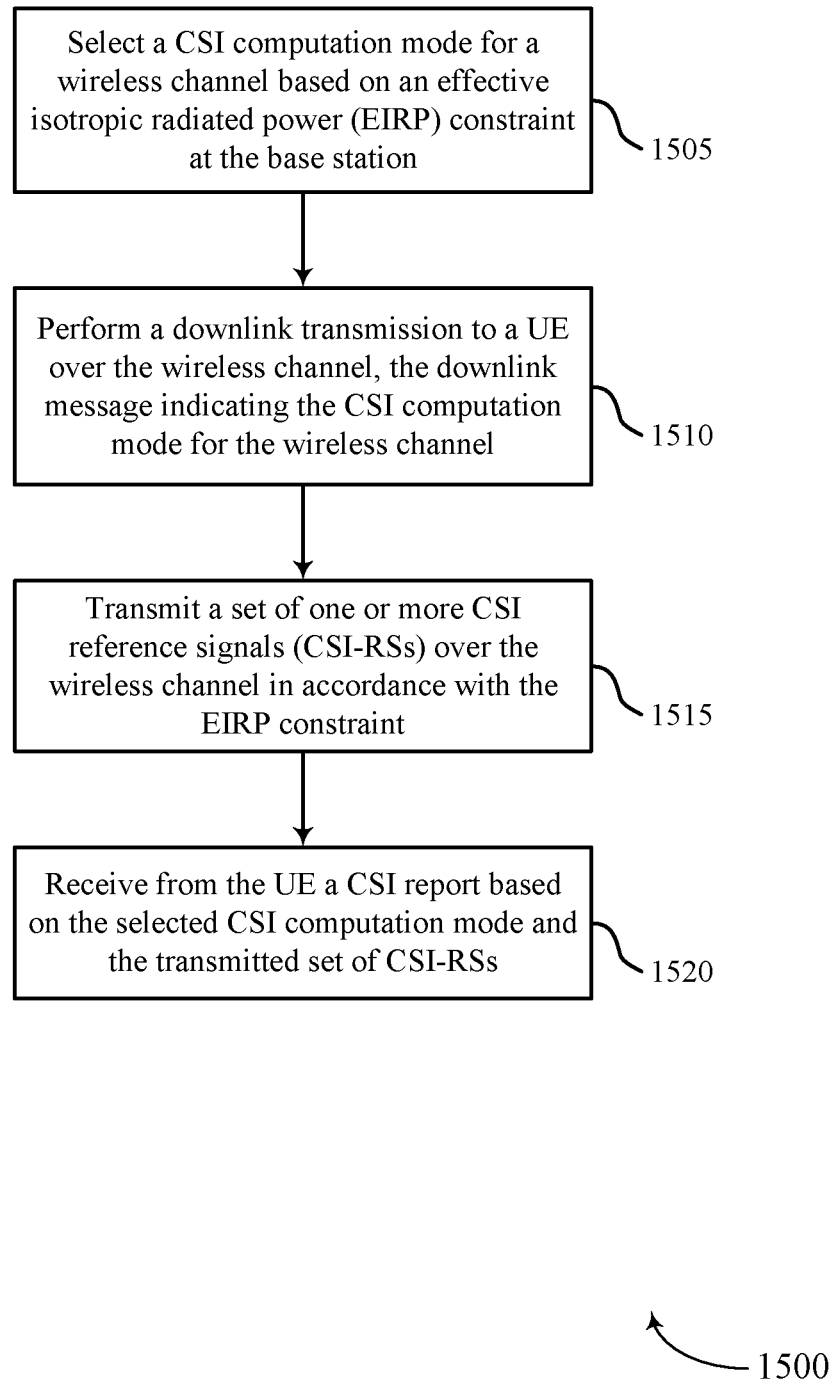

FIG. 15 shows a flowchart illustrating a method 1500 that supports CSI computation for EIRP-constrained transmissions in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1505, the base station may select a CSI computation mode for a wireless channel based on an EIRP constraint at the base station. The operations of 1505 may be performed according to the methods described herein. In some examples, aspects of the operations of 1505 may be performed by a channel state component as described with reference to FIGS. 10 through 13.

At 1510, the base station may perform a downlink transmission to a UE over the wireless channel, the downlink message indicating the CSI computation mode for the wireless channel. The operations of 1510 may be performed according to the methods described herein. In some examples, aspects of the operations of 1510 may be performed by an operating mode component as described with reference to FIGS. 10 through 13.

At 1515, the base station may transmit a set of one or more CSI-RSs over the wireless channel in accordance with the EIRP constraint. The operations of 1515 may be performed according to the methods described herein. In some examples, aspects of the operations of 1515 may be performed by a channel state component as described with reference to FIGS. 10 through 13.

At 1520, the base station may receive from the UE a CSI report based on the selected CSI computation mode and the transmitted set of CSI-RSs. The operations of 1520 may be performed according to the methods described herein. In some examples, aspects of the operations of 1520 may be performed by a channel state component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 IX, IX, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a downlink transmission from a base station over a wireless channel, wherein the downlink transmission comprises an indication of a channel state information (CSI) computation mode;
   receiving a scaling factor for the indicated CSI computation mode from the base station;
   selecting, based at least in part on the indicated CSI computation mode, an effective isotropic radiated power (EIRP) constrained CSI computation mode for the wireless channel, wherein the EIRP constrained CSI computation mode is based at least in part on an EIRP constraint;
   measuring a set of one or more CSI reference signals (CSI-RSs) from the base station to obtain a CSI measurement;
   scaling the CSI measurement based at least in part on the selected EIRP constrained CSI computation mode according to the scaling factor; and
   transmitting a CSI report to the base station wherein the CSI report is based at least in part on the selected EIRP constrained CSI computation mode and the CSI measurement, wherein the CSI report includes the scaled CSI measurement.

2. The method of claim 1, wherein the indication of the CSI computation mode comprises a configuration of the CSI computation mode from the base station.

3. The method of claim 2, wherein the downlink transmission comprises one or more of: a radio resource control (RRC) message, a medium access control (MAC) control element (MAC-CE), or downlink control information (DCI) block.

4. The method of claim 3, wherein the configuration of the CSI computation mode is based at least in part on one or more of: a number of antennas configured for the UE or a number of CSI ports configured for the UE.

5. The method of claim 1, wherein the CSI measurement is scaled based at least in part on one or more of: a transmission rank of the base station or a number of antenna ports of the base station.

6. The method of claim 1, further comprising:
   identifying a precoder of the base station, the precoder based at least in part on a number of antenna ports in use by the base station, wherein the number of antenna ports in use by the base station is fewer than a total number of antenna ports of the base station; and
   using the precoder to receive one or more of: the downlink transmission or a second downlink transmission.

7. The method of claim 1, further comprising:
   receiving from the base station a first rank parameter associated with a transport block size and a second rank parameter indicating a transmission rank;

determining the transport block size based at least in part on the received rank parameter; and using the determined transport block size and the indicated transmission rank to receive one or more of: the downlink transmission or a second downlink transmission.

8. The method of claim 1, further comprising:
using, based at least in part on the CSI computation mode, space time/frequency block coding (STBC/SFBC) to receive one or more of: the downlink transmission or a second downlink transmission.

9. The method of claim 1, further comprising:
adjusting a measured pathloss of the base station based at least in part on the base station operating according to the EIRP constraint; and setting an uplink power for a random access procedure with the base station based on the adjusting.

10. The method of claim 9, further comprising:
receiving an offset parameter from the base station, wherein adjusting the measured pathloss is based at least in part on the received offset parameter.

11. An apparatus for wireless communications at a user equipment (UE), comprising: a processor, memory in electronic communication with the processor; and instructions stored in the memory and executable by the processor to cause the apparatus to:
receive a downlink transmission from a base station over a wireless channel, wherein the downlink transmission comprises an indication of a channel state information (CSI) computation mode;
receive a scaling factor for the indicated CSI computation mode from the base station;
select, based at least in part on the indicated CSI computation mode, an effective isotropic radiated power (EIRP) constrained CSI computation mode for the wireless channel, wherein the EIRP constrained CSI computation mode is based at least in part on an EIRP constraint;
measure a set of one or more CSI reference signals (CSI-RSs) from the base station to obtain a CSI measurement;
scale the CSI measurement based at least in part on the selected EIRP constrained CSI computation mode according to the scaling factor; and
transmit a CSI report to the base station wherein the CSI report is based at least in part on the selected EIRP constrained CSI computation mode and the CSI measurement, wherein the CSI report includes the scaled CSI measurement.

12. The apparatus of claim 11,
wherein the indication of the CSI computation mode comprises a configuration of the CSI computation mode from the base station.

13. The apparatus of claim 12, wherein the downlink transmission comprises one or more of: a radio resource control (RRC) message, a medium access control (MAC) control element (MAC-CE), or downlink control information (DCI) block.

14. The apparatus of claim 13, wherein the configuration of the CSI computation mode is based at least in part on one or more of: a number of antennas configured for the UE or a number of CSI ports configured for the UE.

15. The apparatus of claim 11, wherein the CSI measurement is scaled based at least in part on one or more of: a transmission rank of the base station or a number of antenna ports of the base station.

16. The apparatus of claim 11, wherein the instructions are further executable by the processor to cause the apparatus to:
identify a precoder of the base station, the precoder based at least in part on a number of antenna ports in use by the base station, wherein the number of antenna ports in use by the base station is fewer than a total number of antenna ports of the base station; and
use the precoder to receive one or more of: the downlink transmission or a second downlink transmission.

17. The apparatus of claim 11, wherein the instructions are further executable by the processor to cause the apparatus to:
receive from the base station a first rank parameter associated with a transport block size and a second rank parameter indicating a transmission rank;
determine the transport block size based at least in part on the received rank parameter; and
use the determined transport block size and the indicated transmission rank to receive one or more of: the downlink transmission or a second downlink transmission.

18. The apparatus of claim 11, wherein the instructions are further executable by the processor to cause the apparatus to:
use, based at least in part on the CSI computation mode, space time/frequency block coding (STBC/SFBC) to receive one or more of: the downlink transmission or a second downlink transmission.

19. The apparatus of claim 11, wherein the instructions are further executable by the processor to cause the apparatus to:
adjust a measured pathloss of the base station based at least in part on the base station operating according to the EIRP constraint; and
set an uplink power for a random access procedure with the base station based on the adjusting.

20. The apparatus of claim 11, wherein the instructions are further executable by the processor to cause the apparatus to:
receive an offset parameter from the base station, wherein adjusting the measured pathloss is based at least in part on the received offset parameter; and
set an uplink power for a random access procedure with the base station based on the adjusting.

21. A non-transitory computer-readable medium storing code for wireless communications at a user equipment (UE), the code comprising instructions executable by a processor to:
receive a downlink transmission from a base station over a wireless channel, wherein the downlink transmission comprises an indication of a channel state information (CSI) computation mode;
receive a scaling factor for the indicated CSI computation mode from the base station;
select, based at least in part on the indicated CSI computation mode, an effective isotropic radiated power (EIRP) constrained CSI computation mode for the wireless channel, wherein the EIRP constrained CSI computation mode is based at least in part on an EIRP constraint;
measure a set of one or more CSI reference signals (CSI-RSs) from the base station to obtain a CSI measurement;
scale the CSI measurement based at least in part on the selected EIRP constrained CSI computation mode according to the scaling factor; and
transmit a CSI report to the base station wherein the CSI report is based at least in part on the selected EIRP constrained CSI computation mode and the CSI measurement, wherein the CSI report includes the scaled CSI measurement.

22. The non-transitory computer-readable medium of claim 21,
 wherein the indication of the CSI computation mode comprises a configuration of the CSI computation mode from the base station.

23. The non-transitory computer-readable medium of claim 22, wherein the downlink transmission comprises one or more of: a radio resource control (RRC) message, a medium access control (MAC) control element (MAC-CE), or downlink control information (DCI) block.

24. The non-transitory computer-readable medium of claim 23, wherein the configuration of the CSI computation mode is based at least in part on one or more of: a number of antennas configured for the UE or a number of CSI ports configured for the UE.

25. The non-transitory computer-readable medium of claim 21, wherein the CSI measurement is scaled based at least in part on one or more of: a transmission rank of the base station or a number of antenna ports of the base station.

* * * * *